(12) United States Patent
Moomaw et al.

(10) Patent No.: US 10,693,141 B2
(45) Date of Patent: Jun. 23, 2020

(54) BIPOLAR BATTERY SEAL AND THERMAL RIB ARRANGEMENTS

(71) Applicant: Gridtential Energy, Inc., Santa Clara, CA (US)

(72) Inventors: Daniel Jason Moomaw, Santa Clara, CA (US); Collin Kwok Leung Mui, Mountain View, CA (US); Esteban M. Hinojosa, San Jose, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 182 days.

(21) Appl. No.: 15/744,217

(22) PCT Filed: Jul. 14, 2016

(86) PCT No.: PCT/US2016/042343
§ 371 (c)(1),
(2) Date: Jan. 12, 2018

(87) PCT Pub. No.: WO2017/011695
PCT Pub. Date: Jan. 19, 2017

(65) Prior Publication Data
US 2018/0219227 A1    Aug. 2, 2018

Related U.S. Application Data

(60) Provisional application No. 62/299,877, filed on Feb. 25, 2016, provisional application No. 62/232,764, (Continued)

(51) Int. Cl.
*H01M 4/66* (2006.01)
*H01M 4/68* (2006.01)
(Continued)

(52) U.S. Cl.
CPC ............ *H01M 4/685* (2013.01); *H01M 2/024* (2013.01); *H01M 4/14* (2013.01); *H01M 4/66* (2013.01);
(Continued)

(58) Field of Classification Search
CPC .......... H01M 4/73; H01M 4/82; H01M 10/18; H01M 4/14; H01M 4/16
See application file for complete search history.

(56) References Cited

U.S. PATENT DOCUMENTS 3,016,413 A * 1/1962 Solomon ................. H01M 4/72
429/212
4,275,130 A    6/1981 Rippel et al.
(Continued)

FOREIGN PATENT DOCUMENTS

| CN | 108140907 | 6/2018 |
|---|---|---|
| IN | 201817004888 | 5/2018 |

(Continued)

OTHER PUBLICATIONS

"International Application Serial No. PCT US2016 042343, International Preliminary Report on Patentability dated Jan. 25, 2018", 9 pgs.

(Continued)

*Primary Examiner* — Jeremiah R Smith
(74) *Attorney, Agent, or Firm* — Schwegman Lundberg & Woessner, P.A.

(57) ABSTRACT

A current collector assembly, such as for a bipolar lead acid battery, can include an electrically-conductive silicon substrate and a frame bonded to the electrically-conductive silicon substrate. The substrate can be treated or modified, such as to include one or more thin films which render a surface substrate electrically conductive and electrochemically stable in the presence of a lead acid electrolyte chem- (Continued)

istry. An interface between the frame and the electrically-conductive silicon substrate can be hermetically sealed. In an example, the frame can provide an edge-seal ring configuration. In an example, a casing assembly can include a spacer bonded to the substrate, along with a casing segment and a thermally-conductive rib, the spacer isolating the thermally-conductive rib from the electrically-conductive silicon substrate electrically.

18 Claims, 17 Drawing Sheets

Related U.S. Application Data filed on Sep. 25, 2015, provisional application No. 62/192,760, filed on Jul. 15, 2015.

(51) Int. Cl.
H01M 4/14 (2006.01)
H01M 10/18 (2006.01)
H01M 10/04 (2006.01)
H01M 10/12 (2006.01)
H01M 2/02 (2006.01)
H01M 4/73 (2006.01)
H01M 4/82 (2006.01)
H01M 4/16 (2006.01)
H01M 4/02 (2006.01)

(52) U.S. Cl.
CPC ............. H01M 4/68 (2013.01); H01M 4/73 (2013.01); H01M 4/82 (2013.01); H01M 10/0418 (2013.01); H01M 10/0486 (2013.01); H01M 10/12 (2013.01); H01M 10/18 (2013.01); H01M 4/16 (2013.01); H01M 4/661 (2013.01); H01M 4/667 (2013.01); H01M 2004/029 (2013.01)

(56) References Cited

U.S. PATENT DOCUMENTS

| 4,324,848 | A | * | 4/1982 | Will | H01M 4/68 |
| | | | | | 429/228 |
| 5,376,479 | A | | 12/1994 | Gerner | |
| 5,569,552 | A | | 10/1996 | Rao et al. | |
| 6,762,072 | B2 | | 7/2004 | Lutz | |
| 6,841,295 | B2 | | 1/2005 | Exnar | |
| 7,767,338 | B2 | | 8/2010 | Fredriksson et al. | |
| 2006/0038536 | A1 | | 2/2006 | LaFollette et al. | |
| 2009/0041443 | A1 | | 2/2009 | Aderhold et al. | |
| 2011/0250500 | A1 | * | 10/2011 | Ho | H01M 4/14 |
| | | | | | 429/226 |
| 2012/0156559 | A1 | * | 6/2012 | Davies | H01M 2/0247 |
| | | | | | 429/210 |
| 2013/0065105 | A1 | * | 3/2013 | Faust | H01M 4/14 |
| | | | | | 429/153 |
| 2014/0079985 | A1 | * | 3/2014 | Borden | H01M 4/14 |
| | | | | | 429/185 |
| 2014/0261978 | A1 | | 9/2014 | Furuya et al. | |
| 2014/0349172 | A1 | * | 11/2014 | Mui | H01L 21/4875 |
| | | | | | 429/163 |
| 2014/0370369 | A1 | | 12/2014 | Borden | |

FOREIGN PATENT DOCUMENTS

| JP | 2018524779 | 8/2018 |
| KR | 1020180027596 | 3/2018 |
| WO | 2015103295 | 7/2015 |
| WO | WO-2015103304 A1 | 7/2015 |
| WO | WO-2017011695 A1 | 1/2017 |

OTHER PUBLICATIONS

"European Application Serial No. 16825205.4, Response filed Aug. 22, 2018 to Communication Pursuant to Rules 161(2) and 162 EPC dated Feb. 28, 2018", w English Claims, 19 pgs.
"Chinese Application Serial No. 201680053450.4, Voluntary Amendment dated Oct. 8, 2018", 4 pgs.
"Application Serial No. PCT/US2016/042343, Invitation to Pay Add'l Fees and Partial Search Report dated Sep. 13, 2016", 2 pgs.
"International Application Serial No. PCT/US2016/042343, International Search Report dated Nov. 10, 2016", 4 pgs.
"International Application Serial No. PCT/US2016/042343, Written Opinion dated Nov. 10, 2016", 7 pgs.
"Korean Application Serial No. 10-2018-7004690, Response Filed May 20, 2019 to Notice of Preliminary Rejection dated Mar. 20, 2019", w English Claims, 24 pgs.
"Korean Application Serial No. 10-2018-7004690, Notice of Preliminary Rejection dated Mar. 20, 2019", W English Translation, 11 pgs.
"European Application Serial No. 16825205.4, Extended European Search Report dated Jan. 18, 2019", 7 pgs.
"Indian Application Serial No. 201817004888, First Examiners Report dated Oct. 14, 2019", 6 pgs.

* cited by examiner

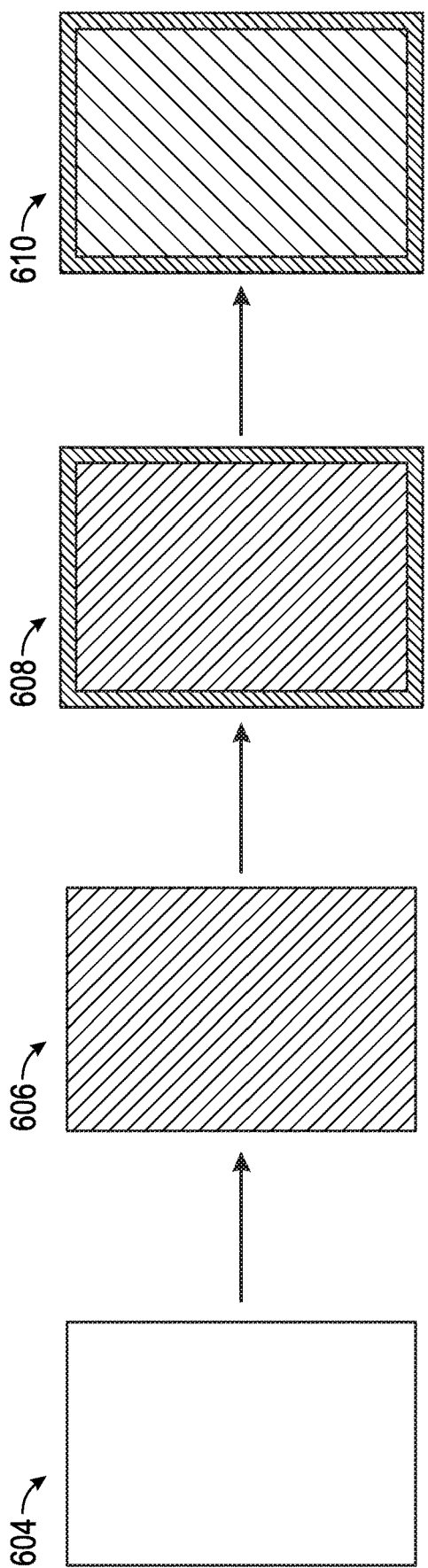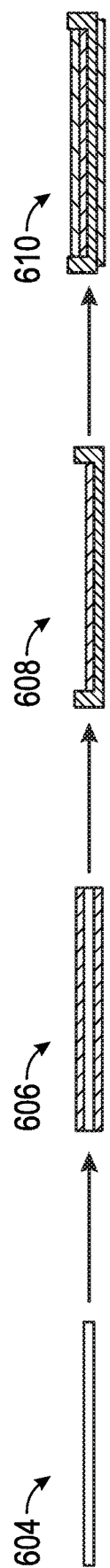
FIG. 6A
FIG. 6B

BIPOLAR BATTERY SEAL AND THERMAL RIB ARRANGEMENTS

CLAIM OF PRIORITY

This patent application is a U.S. National Stage Filing under 35 U.S.C. 371 and claims benefit of priority of International Patent Application PCT/US2016/042343, filed Jul. 14, 2016, and published Jan. 19, 2017 as WO/2017/011695, which claims the benefit of priority to each of (1) Moomaw et al., U.S. Provisional Patent Application No. 62/192,760, titled "BATTERY SEAL USING WAFER BONDING," filed on Jul. 15, 2015; (2) Moomaw et al., U.S. Provisional Patent Application No. 62/232,764, titled "BIPOLAR BATTERY HAVING THERMALLY CONDUCTIVE RIB," filed on Sep. 25, 2015; and (3) Moomaw et al., U.S. Provisional Patent Application No. 62/299,877, titled "SILICON CURRENT COLLECTOR FOR BIPOLAR BATTERY," filed on Feb. 25, 2016, the benefit of each of which is hereby presently claimed, and the entirety of each of which is hereby incorporated herein by reference.

BACKGROUND

Bipolar batteries can provide simplicity of construction and performance advantages as compared to monopolar-architecture batteries, such as making bipolar batteries well-suited for many modern energy-consuming applications. A bipolar battery generally includes battery cells that are connected in series. For example, each cell generally includes two electrodes, a positive active mass, a negative active mass, an electrolyte reservoir, and a casing or package. The term bipolar generally refers to a configuration where a current collector assembly, which can be referred to as a "bipole" or "biplate" is positioned within the battery such that positive active material is located on one surface and negative active material is located on an opposing surface of the bipole. Current can flow uniformly through the cross section of the bipole substrate from one active material layer on a first a surface to the other layer on an opposite surface. The current path generally then includes a route through the electrolyte reservoir and into another bipole-active material assembly, or an end electrode. A number of series-connected bipoles determines a total voltage of the battery. The ends of the series-connected stack of bipoles generally each include a monopole, such as one positive end electrode at a first end and one negative end electrode at an opposite end of the stack. The exterior-facing surface of such end electrode monopoles can provide an electrical connection for the battery terminals.

SUMMARY

In an example, a current collector assembly, such as for a bipolar lead acid battery, can include an electrically-conductive silicon substrate and a frame bonded to the electrically-conductive silicon substrate. The electrically-conductive silicon substrate can include one or more thin films which render a surface of the electrically-conductive silicon substrate electrically conductive and electrochemically stable in the presence of a lead acid electrolyte chemistry. An interface between the frame and the electrically-conductive silicon substrate is hermetically sealed. In an example, a casing segment and a thermally-conductive rib can be included as a portion of the current collector assembly, the thermally-conductive rib bonded to the casing segment and the frame. The frame can form a spacer that isolates the thermally-conductive rib from the electrically-conductive silicon substrate electrically.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A and FIG. 6B illustrate generally views of a technique, such as method, that can include fabricating a bipolar battery current collector assembly, including a plan view in FIG. 6A, and a section view in FIG. 6B.

DETAILED DESCRIPTION

Figure 1:
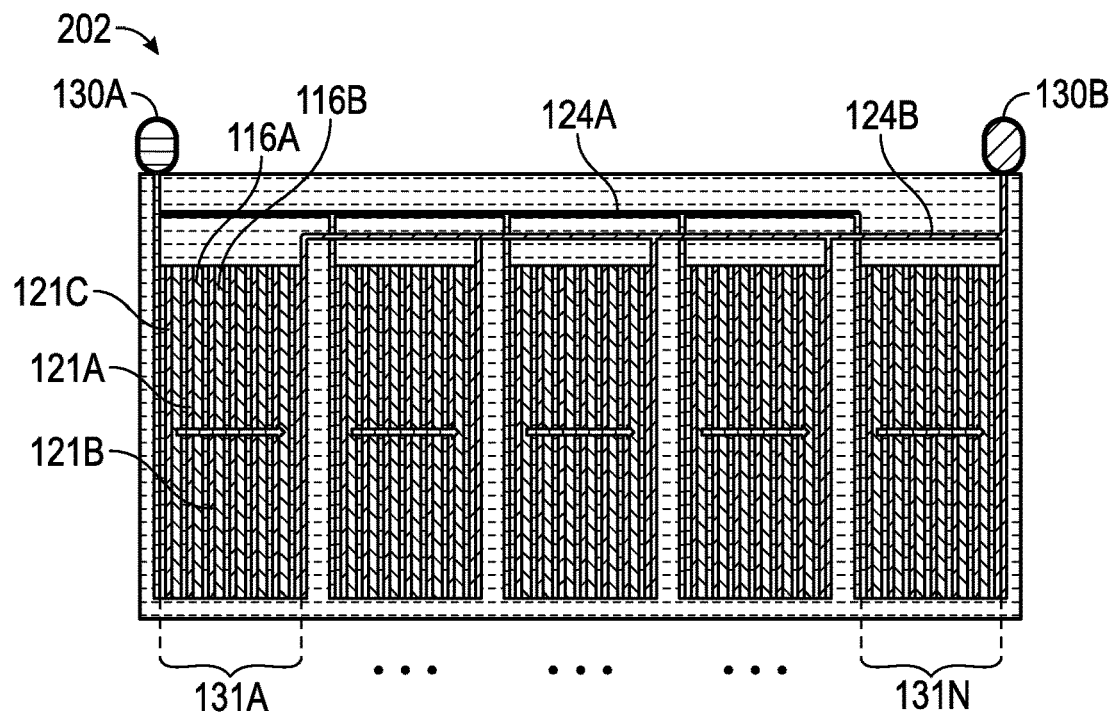
FIG. 1 illustrates generally an example including a bipolar battery architecture.

Despite relative simplicity and low cost, generally-available lead acid battery technology can suffer from several drawbacks. For example, generally-available lead acid batteries can provide low energy densities partly because the lead alloy grids do not generally contribute to energy storage capacity. Also, cycling performance of lead acid batteries can often be poor under high-current-rate or deep discharge conditions. Lead acid batteries can also suffer from poor partial-state-of-charge performance and can have high self-discharge rates. Such performance characteristics can be traced back at least in part to the configuration of generally-available lead acid batteries, and can be related to the materials used.

An ohmic drop can develop within a lead acid battery current collector grid as electrochemical current generated at different positions of a pasted plate flows across the grid to the current connection tab, such as related to or exacerbated by a non-uniform distribution of current density. Such an effect can be pronounced when the battery is charged and discharged at high current rates or when the battery is under a deep discharge state. Such a non-uniform current density distribution generally accelerates certain failure mechanisms, including "sulfation," which generally refers to irreversible capacity loss due to sulfate crystal formation in the paste, and "stratification,", wherein denser electrolyte can sink to the bottom of the battery casing.

Current collector grids generally include elements introduced intentionally into the lead alloy, such as to improve mechanical properties without affecting electrochemical characteristics. However, many trace elements can form compounds with the lead alloy grid or promote side reactions during battery operation. As side reactions compete with the electrochemical reactions of charging and discharge, "symptoms" such as low efficiency, high self-discharge and poor partial state of charge appear during battery operation.

Traditional lead acid batteries are often constructed according to a "monopolar" configuration. In the monopolar configuration, cells are generally arranged electrically in parallel to multiply the cell capacity, and a predominant current flow occurs in a direction parallel to the surface of the monopolar plates. However, as discussed above, generally-available lead acid technology has several shortcomings related to its monopolar configuration and materials generally used in the current collector grids. By contrast, a "bipolar" architecture can include a different mechanical configuration and can use a different combination of materials, to provide improved, performance as compared to a monopolar configuration.

In bipolar configuration, cells are generally arranged electrically in series to develop the specified cell voltage, and current generally flows perpendicular to the surface of the bipolar plates (e.g., across the bipolar plate from one surface to an opposite surface). Construction of a bipolar battery can include various steps. For example, a bipolar current collector can be fabricated from a substrate material. Positive and negative polarity active materials can be provide on opposite sides of the bipolar current collector to provide bipolar plates.

The bipolar plates can be compressed and stacked, such as including or arranged with separators to provide cell compartments sealed from each other. Such cell compartments can be filled with an electrolyte, and a battery stack is thereby formed to activate the cathode and anode materials. In the bipolar configuration, the current collector substrate itself can provide inter-cell electrical connection. For example, one surface of the bipolar current collector can provide an anode for one cell compartment, and a cathode of the next cell can be provided by the opposite side of the bipolar current collector. Bipolar lead acid technology design and materials can mitigate various drawbacks of generally-available lead acid technology. For example, as current flows through the current collector, current density distribution can be generally independent of the size and shape of the current collector. Accordingly such a current density is reduced during high rate discharge and deep discharge operations as compared to a monopolar configuration.

Materials used for the bipolar current collectors are not limited to lead alloys as in the case of current collector grids, and therefore the substrate material for bipolar current collectors can be specified to satisfy both mechanical and electrochemical objectives. For example, current collectors can be edge-sealed to isolate each cell compartment, and mechanical strength requirements are thereby less stringent as compared to those used in lead alloy grids for monopolar batteries. For example, in a monopolar configuration, an entirety of the mass of the current collectors is generally supported by the current tabs. Such support by the current tabs is not required in a bipolar configuration having edge seals.

FIG. 1 illustrates generally an example of a bipolar battery architecture. A battery pack 202 can include one or more bipolar battery plates, such as bipolar plates 121A, 121B, and 121C. The bipolar plates 121A, 121B, or 121C can include one or more thin film layers, such as silicide layers, on one or more sides of the plate assembly, such as shown and described in other examples herein.

As in FIG. 1, a first terminal 130A can provide a first polarity, and a second terminal 130B can provide an opposite second polarity. The bipolar plates can be sandwiched with electrolyte in regions 116A and 116B, for example, to form sealed cells. In an example, an electrolyte in region 116A can be one or more of fluidically isolated or hermetically sealed so that electrolyte cannot bypass the bipolar plate 121A to an adjacent region such as the electrolyte region 116B, or to suppress or inhibit leakage of electrolyte from the pack 202. A frame or edge-seal ring can be included to one or more of mechanically reinforce the plate assembly or provide sealing action, such as shown and described in other examples. As shown illustratively in FIG. 1, cells can be disposed in a series configuration. The cells can be aligned to form a stack 131A.

In a bipolar architecture, a current collector (e.g., a silicon substrate 104 such as included as a portion of the bipolar plate 121A) can be shared between the negative electrode of one cell and a positive electrode of the next. A first bus 124A can connect to a first electrode in each stack 131A through 131N, and a second bus 124B can connect to an opposite electrode in each stack 131A through 131N. The stacks 131A through 131N can each provide serial connections through the bulk of the conductive silicon substrates as shown by the arrows. In this manner, a total number of interconnect buses external to the stack 131A through 131N can be reduced as compared to an architecture using monopolar plates.

Other configurations of interconnecting one or more stacks 131A through 131N can be used. For example, bipolar stacks 131A through 131N can be connected in parallel for lower voltage applications, such as to assemble a lower voltage battery pack. Alternatively, a single bipolar stack with many cells can form a higher-voltage pack. In a lead-acid example, a single cell voltage can be around 2.1V.

The bipolar configuration of FIG. 1 can provide advantages as compared to a monopolar configuration. For example, a bipolar configuration can be simpler because electrical circuits and control systems to regulate the operation of parallel cells in a monopolar battery can be eliminated. As another example, because an entirety or nearly an entirety of a bipolar plate 121A can be used for electrical conduction inside the battery, a higher current density and therefore a higher power delivered can be achieved using a bipolar battery assembly of comparable mass to a corresponding monopolar battery assembly. As another example, lead metal grids are not generally used as current collectors in a bipolar lead acid battery configuration, so a stronger and lighter substrate material for a current collector can provide significant improvement in energy density of the battery.

In addition to electrical conduction, a bipolar current collector substrate generally isolates electrolyte between adjacent cells inside the battery, and generally the materials used for the current collector are specified to suppress or inhibit corrosion when immersed or surrounded in the electrolyte (e.g., $H_2SO_4$) throughout the lifetime of the battery. Electrically, a current collector substrate can be specified to include a high electronic conductivity but a low ionic conductivity such that it acts as a current collector which also isolates an intercell through-diffusion of electrolyte. Chemically, the substrate can be specified to resist $H_2SO_4$ corrosion, and its surface can be specified to be inert towards passivation in $H_2SO_4$. Such passivation can render the current collector non-conductive.

Electrochemically, the current collector surface is generally specified to have a wider and more stable potential window as compared to the charge and discharge electrochemical reactions of the battery. Specifically, in the example of a lead acid chemistry, the cathode and anode surfaces are generally specified to have higher oxygen and hydrogen evolution over-potentials than those on $PbO_2$ and Pb, respectively, and the over-potentials are specified to be relatively stable throughout the lifetime of the battery. The high over-potentials can help to reduce or minimize gas evolution due to water electrolysis side reactions at the electrodes. Such side reactions can lead to one or more of coulombic efficiency reduction, active material loss, capacity fade, or premature failure of the battery.

Previous attempts to develop substrate materials for bipolar lead acid batteries suffer from different obstacles. Although lead metal can be used, lead is a relatively soft metal, and it corrodes in $H_2SO_4$. Most other metals, although electronically conductive, either corrode or passivate in $H_2SO_4$. Composite materials, despite having a wide variety of composition and property options, often suffer from one or more of low electronic or high ionic conductivities.

The present inventors have recognized, among other things, that silicon can be used, such as a substrate, for a current collector for a bipolar lead acid battery. For example, silicon wafers are readily available in different sizes and shapes, and are widely used in different industries. Mono-crystalline or poly-crystalline silicon are generally impervious to $H_2SO_4$, and can be doped to achieve a specified conductivity. Although an insulating oxide can form on a silicon surface, a variety surface modification processes can be used to provide desired chemical and electrochemical surface properties. For example, a metal silicide can be formed on a silicon surface by annealing a metal thin film deposited on the surface. A metal silicide generally forms a low resistivity ohmic contact with the silicon, protects the underlying silicon from oxidation or passivation, and extends an electrochemical stability window of the surface. One or more thin films can be deposited onto the substrate to enhance its surface properties towards active material adhesion, such as one or more thin films deposited after silicide formation.

Figure 2:
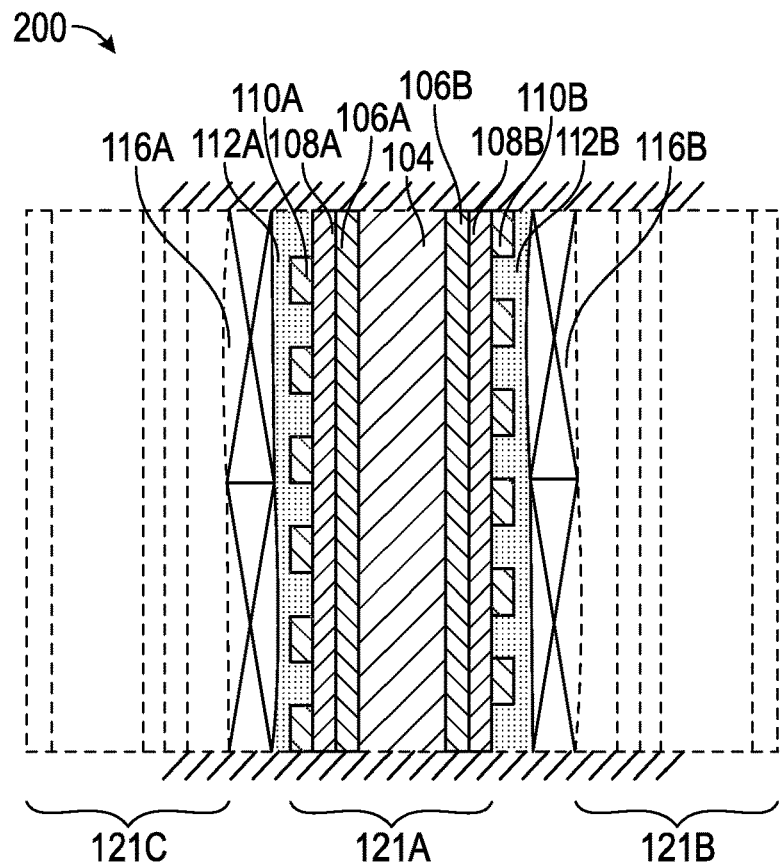
FIG. 2 illustrates generally a section view of an example including a bipolar battery plate, such as can be included as a portion of a bipolar battery assembly.

FIG. 2 illustrates generally a section view of an example including a bipolar battery plate 121A, such as can be included as a portion of a bipolar battery assembly 200. The first bipolar battery plate 121A can include a rigid conductive silicon substrate 104 as a current collector. The silicon substrate 104 can include a circular, clipped, square, or rectangular configuration, such as including a thin wafer. The silicon substrate 104 can include semiconductor grade, solar grade, or metallurgical grade silicon, and the silicon substrate 104 need not be mono-crystalline. The silicon substrate 104 can include one or more dopants or impurities, such as to enhance a bulk conductivity of the substrate 104, such as shown and described in other detailed embodiments, elsewhere in this document.

The bipolar battery plate 121A can include one or more of an ohmic contact layer 106A and an adhesion layer 108A located at or near a first surface of the conductive silicon wafer 104. An active material 112A can be applied or deposited on the plate 121A, such as including a first polarity, such as supported during or after fabrication by a mechanical support 110A. A second ohmic contact layer 106B can be included on a second surface of the conductive silicon wafer 104 opposite the first surface. The second ohmic contact layer 106B can include the same material as the first ohmic contact layer 106A or a different material, such as to provide an electrode for connection to other portions of a battery assembly, to provide a corrosion-resistant layer, or to provide a mirror image configuration having a stack-up similar to the first surface of the conductive silicon wafer 104. A second adhesion layer 108B can also be included. A second active material 112B can be included, such as having a polarity opposite the first active material 112A. The first and second contact layers 106A and 106B can be formed using one or more techniques described elsewhere herein, such as including sequentially or contemporaneously annealed silicide layers.

A first electrolyte region 116A can separate the battery plate 121A from an adjacent battery plate 121C, and a second electrolyte region 116B can separate the battery plate 121A from another adjacent battery plate 121B. The electrolyte regions 116A and 116B can include a separator, such as assist in maintaining a specified separation between the battery plates. The electrolyte regions 116A and 116B are generally fluidically isolated from each other so that conduction occurs serially through a bulk of the conductive silicon substrate 104.

The first and second active materials 112A and 112B can include positive and negative active materials, respectively, such as located (e.g., formed or deposited) on opposite sides of the bipolar plate 121A as shown illustratively in FIG. 2. Surface modification processes applied to the silicon wafer substrate can be specified to provide a surface compatible with both cathode and anode electrochemistry. However, in some configurations different surface modifications can be used for the two sides of the bipolar substrate. For example, the present inventors have also recognized that it may be beneficial to tailor surface chemical and electrochemical properties for the cathode and anode side of the substrate 104 independently, such as with respective (e.g., different) surface modifications corresponding to the anode side versus the cathode side.

To form different metal silicides onto the opposite sides of the substrate 104, a number of approaches can be used. In one approach, a metal film can be deposited onto one side, followed by depositing the second metal film onto the other side of the substrate. The substrate can then be annealed to convert both metal films to metal silicides. However, different metal silicides can have different sintering (conversion) temperatures, and it may not be possible to anneal at the same temperature two different silicides with electrochemical characteristics desirable for cathode and anode use. In such an example, a metal with a higher sintering temperature, which is stable to higher temperature, can be deposited onto one side of the silicon substrate 104 and annealed to form a first metal silicide. The second metal can then deposited onto the opposite side of the substrate 104, and the substrate 104 can then be annealed at the lower sintering temperature, at which the first silicide is stable, to form a second silicide.

Similarly, respective (e.g., different) film stacks can be deposited onto the opposite sides of the bipolar substrate to improve adhesion of the positive and negative active materials on the two sides of the bipolar plate 121A. To assemble a bipolar lead acid battery, modified silicon current collector substrates can be fabricated with positive and negative active materials, sealed to isolate individual cells, stacked with separators, and filled with electrolytes, such as in a manner in which the cells are in a series configuration as shown illustratively in the bipolar stacks of FIG. 1 and the example of FIG. 2.

Bipolar Current Collector Assemblies, Such as can be Fabricated Using Wafer Bonding, and Such as can Include Edge Seals In a bipolar battery assembly, particularly an assembly using an electrolyte that can leak or flow, individual bipoles can be hermetically sealed into a casing frame to avoid, performance-destroying electrical shorts. As a result of this propensity for shorting, the packaging configuration of a bipolar battery assembly takes on a greater significance than in other configurations, such as monopolar battery assemblies. Generally, seals or other bonds between each bipole and a larger casing are configured to be robust and defect-free, and they also are also configured for repeatable manufacture.

Generally, a bipolar battery configuration delivers its output power through having a battery output voltage that is higher in comparison to other battery technologies. Such larger voltages can be developed by a stack of cells defining electrolyte regions that are kept isolated from one another, such as fluidically isolated. The present inventors have recognized, among other things, that maintaining such isolation as the number of cells increases can be very difficult in a manufacturing environment. This has been a failure mode for other bipolar battery configurations lacking such robust isolation. A particular difficulty can arise when the biplate is manufactured from markedly different material than the casing. In general, a casing frame (e.g., a casing "segment") can be formed from a thermoplastic material such as acrylonitrile butadiene styrene (ABS), polypropylene, polycarbonate, or another material. The low melting temperatures of such materials might constrain the available sealing methods for bipolar batteries because the biplates may be made from metallic or ceramic blends. Accordingly, a variety of welding or melting processes cannot be leveraged when there is a large difference in a melting temperature of the casing material as compared to the material or materials forming the biplate assembly.

In one approach, a gasket can be used to provide such a seal. Such gaskets can be available and sourced for use in other industrial applications and are generally made from readily-available non-corrodible materials such as rubber or polytetrafluoroethylene (PTFE). With sufficient compression, it is possible to achieve reliable seals using such materials. However, a consistent level of compression is difficult to maintain over a life of a battery assembly, and for large battery stacks the gaskets can end up being compressed differently because of manufacturing variations, such as those caused by variation within the gaskets. Furthermore, careful surface preparation is generally practiced, such as to avoid microvoids that can develop between the bipole and the gasket. Such voids can allow unwanted ionic conductivity between cells.

In another approach, various types of adhesives can be used instead of a gasket-based approach. Such adhesives can include, for example, epoxies. Adhesives are an appealing option because their initial liquid form, and at least in theory, allows them to fill in any voids or other irregularities in a bipole or packaging frame thus greatly diminishing the chances of an ionic leak. Furthermore, adhesive dispensing equipment is generally available and can provide for automation of repeatable application of certain adhesives, such as can facilitate high manufacturing throughput compared to other approaches.

Without being bound by theory, the present inventors have also recognized that such automation might do little to improve the consistency of the epoxy adhesive beads upon compression. Voids and air pockets can still form readily form during a curing process and such defects can allow electrolyte to leak to an opposite side of the biplate, bypassing the conductive substrate of the biplate (e.g., creating an unwanted electrical short circuit). Adhesives also tend to be relatively costly and a working life of an adhesive can limit a duration of time available for assembly. For example, the assembly of high voltage stacks can be problematic using adhesive-based seal configurations. Chemical attack can also lead to gradual degradation of an adhesive-based seal, such as over prolonged exposure. This creates the potential for seal failure simply due to aging of the device. Adhesives are applied in liquid form and thus have a tendency to flow. For example, adhesive is usually pushed out of the joint itself during compression and into the surroundings. This can lead to visually unappealing seals that are not acceptable for a commercial product.

In yet another approach, a ceramic-plastic configuration can be used for the biplate. An induction welding process can be used such as to fuse a biplate to a casing. For example, metallic wires can be positioned between ceramic-plastic bipoles and casing frame elements during assembly. The battery stack including casing frame elements and bipoles can be compressed and placed inside an inductive chamber or coil. By energizing an external inductive coil, a magnetic field is created that induces heat within the metallic wires placed within the assembly. This heat causes the surrounding frame material to melt and creates a hermetic seal. Induction welding is a generally-available welding technique can be used to generate reliable seals. But, the specialized equipment can be expensive and the metal of the wires may be specialized, such as specified for compatibility with battery chemistry to protect against contamination. Furthermore, induction welding generally includes use of a more complex bipole material matrix with many possible failure triodes. Accordingly, manufacturability remains a serious challenge to fabrication of bipolar battery assemblies having robust seals. A strong seal might be provided at laboratory scale, but various approaches fail when an attempt is made to scale such approaches to high-volume assembly.

As mentioned above, the present inventors have recognized, among other things, that a bipolar configuration can present challenges, such as relating to one or more of substrate material selection and configuration, intercell seal configuration such as to provide reliability, and thermal management. As an example, a substrate material can be specified to provide an electrically conductive medium for intercell connection, and can be ionically impervious to prevent intercell leak, chemically resistant to corrosion by sulfuric acid electrolyte, and electrochemically stable to suppress or inhibit side reactions within the operating range of battery chemistry (e.g., lead acid chemistry).

The substrate material can also include a configuration to facilitate edge sealing. Materials having a high thermal conductivity can be used for one or more of the substrate or a support frame, such as to facilitate heat transfer or removal. Other considerations for selection of substrate material can include cost, availability or abundance, and recyclability at the time of disposal of the battery assembly.

Subject matter herein generally relates to a current collector and bipolar battery configuration. In an example, a silicon substrate such as a silicon wafer can be used as the substrate of the current collector. Silicon is much less dense than lead, and silicon generally provides a higher thermal conductivity than lead. Silicon can be doped with donor or acceptor impurities to modulate a conductivity of the silicon, such as to achieve acceptable bulk electrical conductivity. Silicon is generally impervious to sulfuric acid, and therefore chemically resistant to sulfuric acid corrosion. A wide variety of processes can be applied to modify the surface of a silicon substrate, such as to render it electrochemically stable. Wafer bonding technologies can be used, such as to facilitate packaging of the silicon substrate in a battery assembly. For example, using a wafer bonding technique, silicon substrates can be included as a portion of a hermetically-sealed cell or assembly. Silicon is abundant and economical for use in high-volume manufacturing.

In an example, a silicon wafer can be modified, such as according to one or more processes to render the substrate suitable for use as a bipolar current collector. For example, in order to form an ohmic contact on the surface and protect it from native oxide formation, a metal silicide can be formed on one or both sides of the silicon wafer by annealing a thin layer of metal deposited on the wafer. In addition to use as an ohmic contact layer, certain metal silicides are electrochemically stable with no side reactions within the operating range of lead acid chemistry, so the ohmic layer can also serve as a passivation layer.

A silicon wafer can be edge sealed, such as by use of direct wafer bonding or adhesive wafer bonding, such as at high temperature. A thin layer of lead or lead alloy can be deposited or affixed to one or more surfaces of the silicon wafer, such as to facilitate or improve adhesion of positive and negative active materials. Such active materials can be deposited upon opposite surfaces of the silicon wafer current collector.

In examples described herein, a bipolar current collector having a silicon substrate can be used, such as having a configuration shown and described in U.S. Patent Application Pub. No. US 2014/0370369 A1, which is incorporated herein by reference in its entirety. However, other bipolar current collector materials can be used without departing from the scope of the subject matter described herein. Use of silicon facilitates benefits from existing economies of scale developed for processing silicon material in both the semiconductor and solar industries. For example, one process can include wafer bonding. Wafer bonding generally refers to creation of permanent joints between silicon wafers, such as for semiconductor applications. The bonds are generally specified to survive the large temperature fluctuations that semiconductors experience during operation or certain fabrication operations. Wafer bonding is generally completed with tight process control to prevent contamination of sensitive components on the wafer surfaces. Wafer bonding can be performed within an environmentally controlled chamber such as under a vacuum. Such processing enables highly repeatable bonds to be produced at a large scale.

Within the larger field of wafer bonding, many specific processes can be used for handling particular material. Direct wafer bonding and adhesive wafer bonding are two examples. Direct wafer bonding generally refers to silicon-to-silicon bonds, and is not necessarily applicable to bipolar battery plate technology. By contrast, adhesive wafer bonding has direct applications for bipolar batteries, because such adhesive bonding is surface agnostic. With the proper surface cleaning any materials can be joined through adhesive wafer bonding. Furthermore, almost any adhesive will work as long as it can wet the surface to be bonded. In general, adhesive wafer bonding is not known for generating hermetic seals, but this is due to the generally-available adhesives used in the semiconductor processing industry. Such adhesives are primarily temporary and therefore there is no need for strictly hermetic joints.

However, the present inventors have recognized that if a hermetic bond is desired, a wide range of adhesives that will permanently bond will also properly wet under a vacuum. The completed bond can be high strength, hermetic, and slim in profile. Such slimness is an advantage because it leaves less surface area open for attack from electrolyte, thus prolonging the life of the bond.

Adhesive wafer bonding can include a three-operation process. In the first operation, adhesive can be applied to the surfaces to be bonded. This can be performed by spin-coating. When adhesive is only desired in certain regions, a masking technique can be used to control adhesive flow. The spin coating process ensures an even bead of adhesive across the surfaces of the bonding zones. A second operation can include high-precision alignment of the mating pieces. Such alignment is used in semiconductor industry to ensure that devices built on the silicon surfaces properly contact from one surface to the next. In a battery application this alignment technique can be less stringent, but such alignment is still used such as to ensure no voids are created in the adhesive layer. The third operation can include compression. The aligned and coated pieces can be moved into an environmentally controlled chamber, such as under high vacuum. The coated surfaces are then quickly pressed into one another. A temperature of the chamber can be increased during or after such compression to facilitate initial curing.

One or more of a speed of compression and force with which the components are held together can be controlled electronically. A quality of the adhesive bond can be related to the compression technique. Compression that occurs too slowly or quickly can facilitate formation of unwanted air bubbles or other defects. Once initial curing is completed, the now-bonded components can be removed from the processing chamber and are ready for further assembly or processing.

Figure 3A:
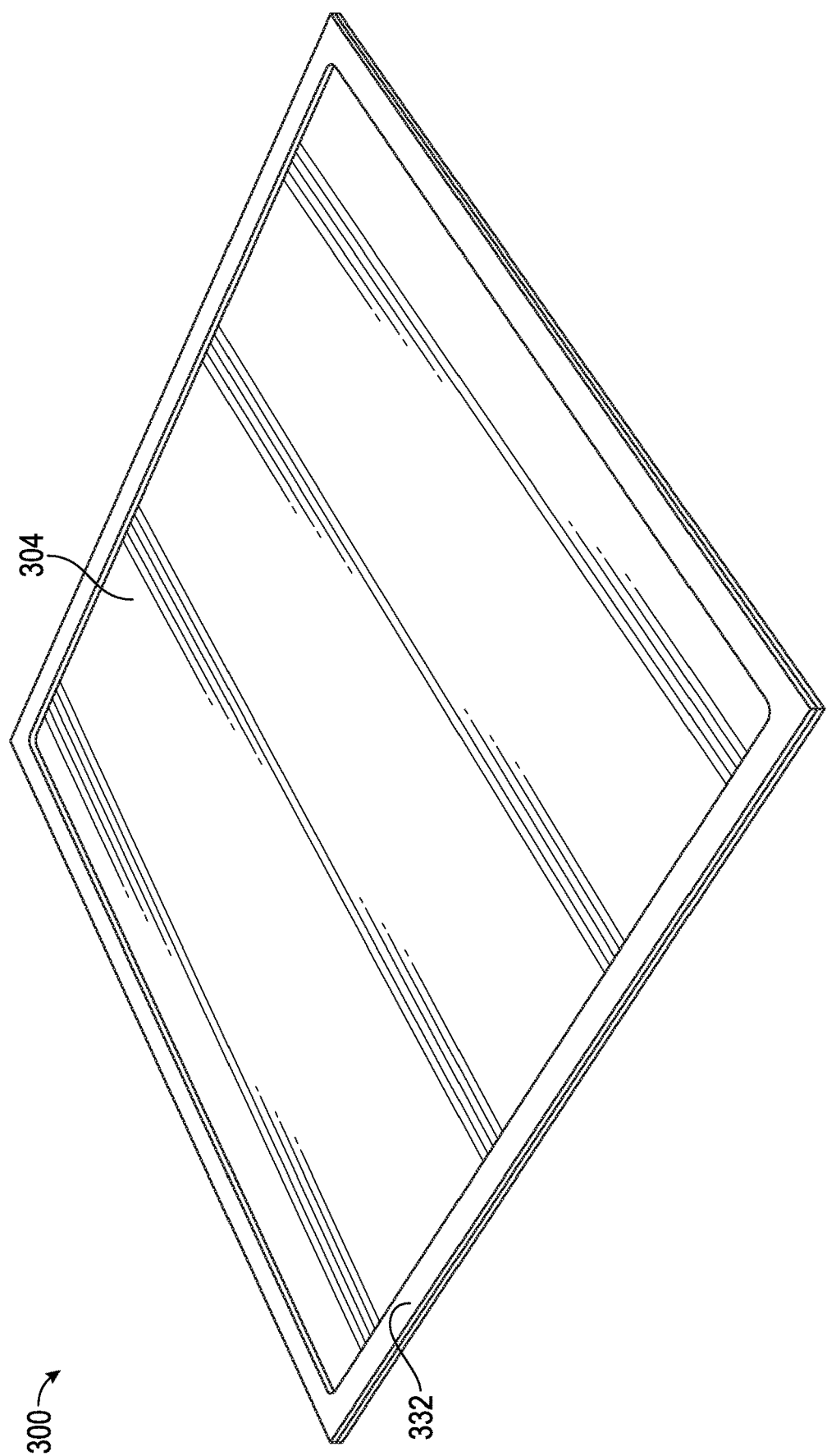
FIG. 3A and FIG. 3B illustrate generally respective views including perspective view in FIG. 3A and a section view in FIG. 3B of at least a portion of a bipolar battery current collector (e.g., "biplate") assembly including a support frame.
Figure 3B:
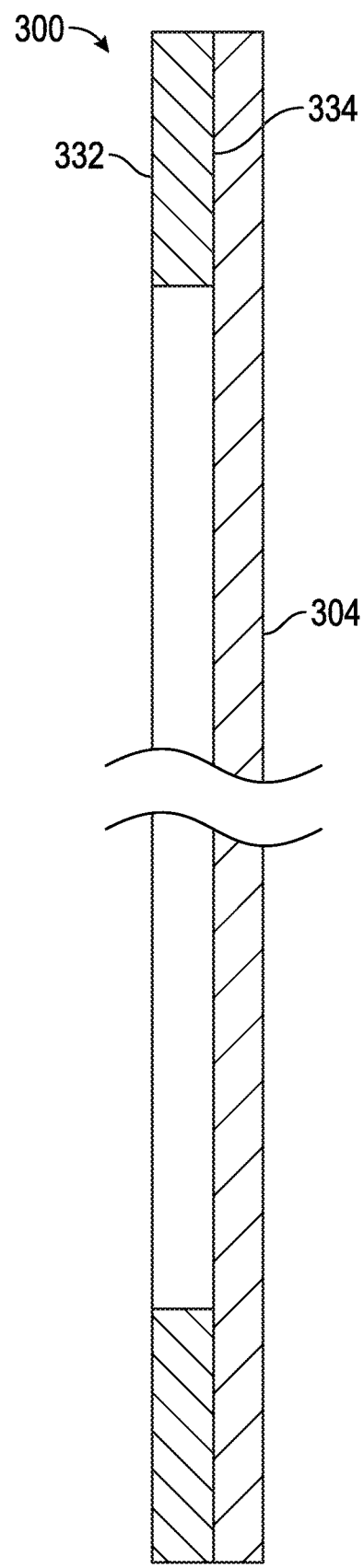

FIG. 3A and FIG. 3B illustrate generally respective views including a perspective view in FIG. 3A and a section view in FIG. 3B of at least a portion of a bipolar battery current collector assembly "biplate") 300 including a support frame 332.

Figure 4A:
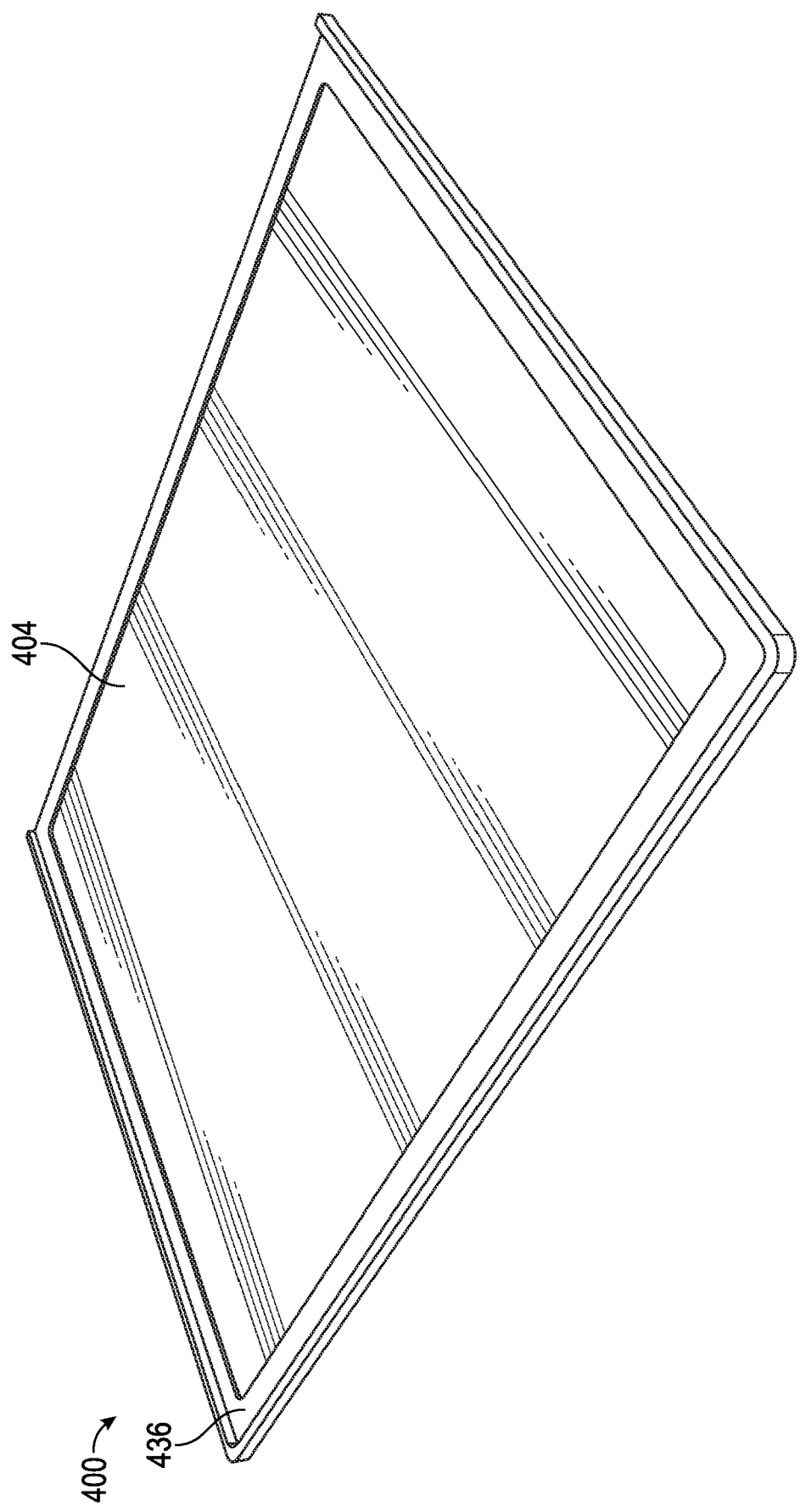
FIG. 4A and FIG. 4B illustrate generally respective views including a perspective view in FIG. 4A and a section view in FIG. 4B of at least a portion of a bipolar battery current collector assembly including a support frame having a ring extending beyond the bipolar current collector.
Figure 4B:
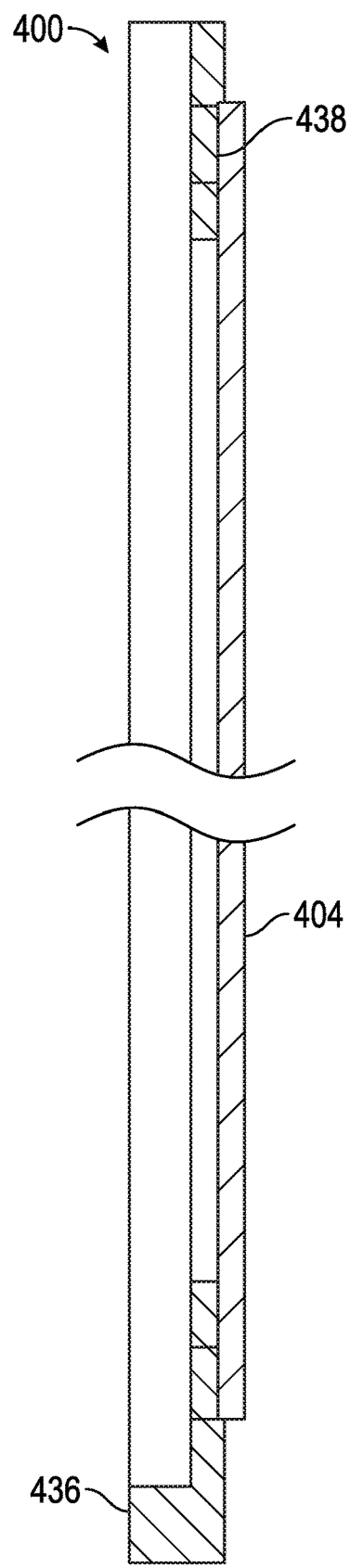

FIG. 4A and FIG. 4B illustrate generally respective views including a perspective view in FIG. 4A and a section view in FIG. 4B of at least a portion of a bipolar battery current collector assembly 400 including a support frame 436 including a ring extending beyond the bipolar current collector.

In FIG. 3A and FIG. 3B, a conductive current collector substrate, such as an electrically-conductive wafer 304 can be bonded to the support frame 332, such as using an adhesive layer 334 at the interface between the electrically-conductive wafer 304 and the support frame 332. Similarly, in FIG. 4A and FIG. 4B, an electrically-conductive wafer 404 can be bonded to a support frame 436, such as using an adhesive at the interface 438 between the electrically-conductive wafer 404 and the support gram 436. The support frame 332 of FIG. 3A and FIG. 3B, or the support frame 436 of FIG. 4A and FIG. 4B can include polymer or plastic material, or one or more other materials.

Generally, a bipolar battery assembly casing can be discretely segmented into individual components or elements, and a non-conductive (e.g., plastic) frame bonded to the current collector substrate can form a segment of the external casing itself. If, however, the outer casing is separate from the biplates, the support frame (e.g., the support frame 332 as in FIG. 3A and FIG. 3B, or the support frame 436 as in FIG. 4A and FIG. 4B, as illustrative examples) can act as a carrier. A carrier can provide multiple mechanical features. For example, a carrier or frame eases handling of the biplate by protecting its edges and reducing the likelihood of damage during later assembly operations. Such a plastic carrier allows a biplate of any material to be easily fused to the larger bipolar casing using well established plastic welding techniques. In this manner, a sealed casing assembly can be formed.

For example, the biplate is bonded to the carrier, and the carrier can then be fused to the casing (e.g., a casing "segment") to provide a unitized assembly. Use of generally-available plastic welding techniques facilitates ease of manufacturing. The carrier or "secondary" plastic frame can be provided in a variety of forms. In the example of FIG. 3A and in FIG. 3B, the support frame 332 has a perimeter that can exactly matches the dimensions of conductive current-collector substrate (e.g., matching the dimensions of the wafer 304). This ensures minimal weight gain and allows easy adoption of the techniques described herein in a bipolar architecture without needing to redesign for a casing having a larger footprint than the existing biplate substrates.

In another example, as shown in FIG. 4A and FIG. 4B, the support frame 436 includes a slightly different configuration that extends beyond the wafer 404 to create a larger surface area, such as to facilitate plastic welding or other assembly operations. For example, the extra material comprising the support frame 436 could facilitate the use of ultrasonic welding by leaving room for the horn in a region extending beyond the footprint of the wafer 404, but other welding processes can also be used. Referring back to FIG. 3A and FIG. 3B, a plastic welding technique can also be used, if the wafer 304 is protected from damage by the heat or vibration of such processing. In FIG. 4A and FIG. 4B, the extended support frame 436 separates the wafer 404 from the welding operation for improved durability as compared to other approaches.

In the illustrative example FIG. 3A, the support frame 332 is shown as applied to just one surface of the wafer 304, although bonding to both surfaces of the wafer 304 is also possible. For example, bonding to a single side can facilitate tighter process control as compared to bonding to both surfaces. During a heating phase of adhesive bonding, heat buildup can occur within the wafer 304 if both surfaces are being treated simultaneously. A thinness of the adhesive located at the interface 334 as shown in the example of FIG. 3B can facilitate bonding without using large amounts of heat energy, though an amount of heat applied can be specified at least in part to elicit proper wetting of the adhesive.

FIG. 4B illustrates how bonding can be performed between the wafer 404 and the extended support frame 436. For example, the extended support frame 436 can include a cavity or inset, such as to aid in "capturing" or locating the wafer 404 during assembly. This inset can increase a wetted area into which the adhesive can flow. A stronger bond and greater biplate protection may result as a result of such features. Many variations and combinations of the arrangements shown illustratively in FIG. 3A, FIG. 3B, FIG. 4A, and FIG. 4B are possible, particularly if the support frame and substrate (e.g., wafer) are sized and shaped for processing within adhesive bonding equipment. While a secondary support frame (e.g., the support frame 332 or the support frame 436) can be used to protect the current collector substrate (e.g., wafer 304 or wafer 404), it is also possible to perform adhesive wafer bonding directly to a battery casing segment without requiring a separate support frame.

A shape of the support frame and the current collector substrate can be varied to accommodate a plurality of bipolar technologies, though the illustrative examples described herein concern use of semiconductor-grade wafer bonding to seal bipolar battery current collectors into their respective casings. While the phrase "semiconductor-grade" is used to refer generally to a wafer bonding technique, the materials and processing techniques need not adhere strictly to such conditions used in generally-available semiconductor processing. For example, a current collector substrate material need not be semiconductor-grade, and can include multi-crystalline or metallurgical grade material, even though a semiconductor-type wafer bonding technique is used.

Figure 5:
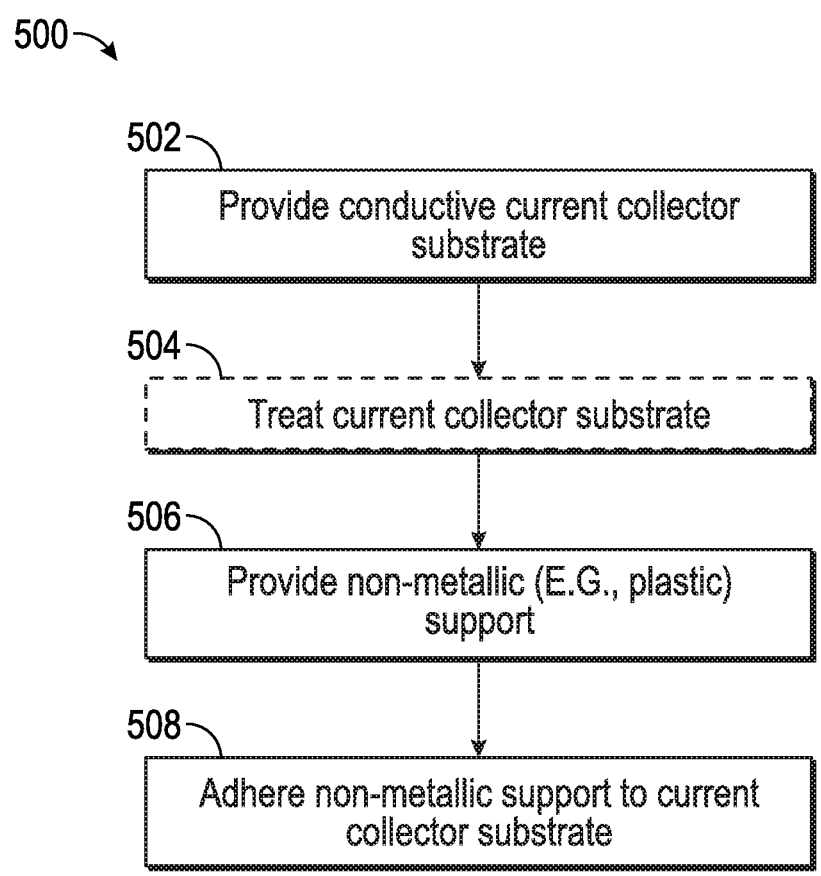
FIG. 5 illustrates generally a technique, such as method, that can include fabricating a bipolar battery current collector assembly.
Figure 7A:
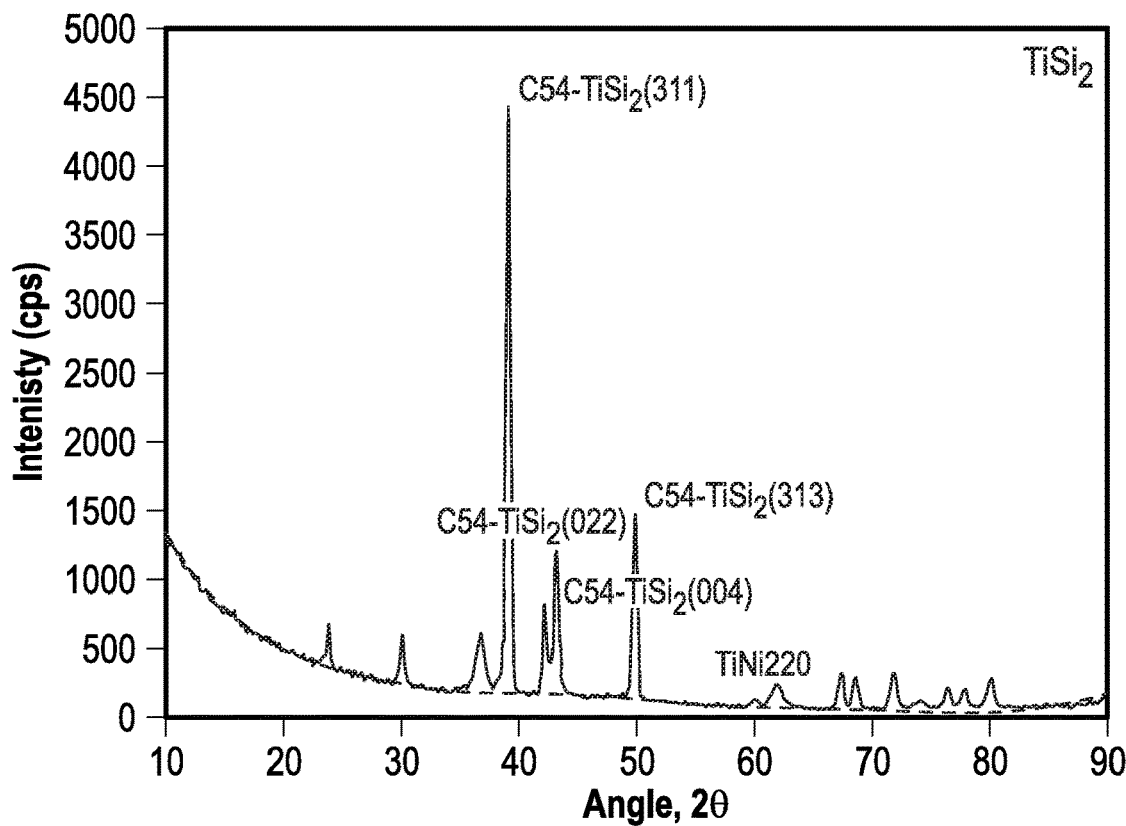
FIG. 7A, FIG. 7B, FIG. 7C, and FIG. 7D illustrate generally glancing incidence x-ray diffraction (XRD) spectra of various metal silicide material layers applied to a conductive silicon substrate, such as for use as a portion of a bipolar battery current collector assembly.
Figure 7B:
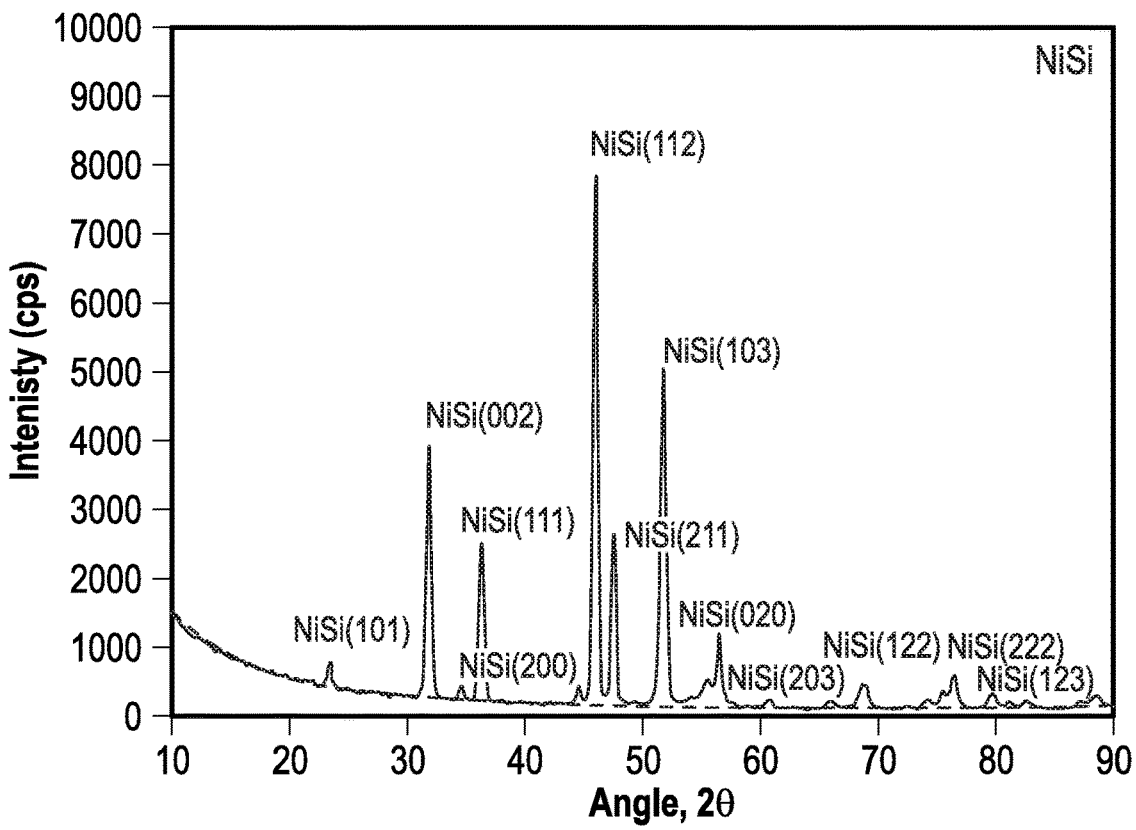
Figure 7C:
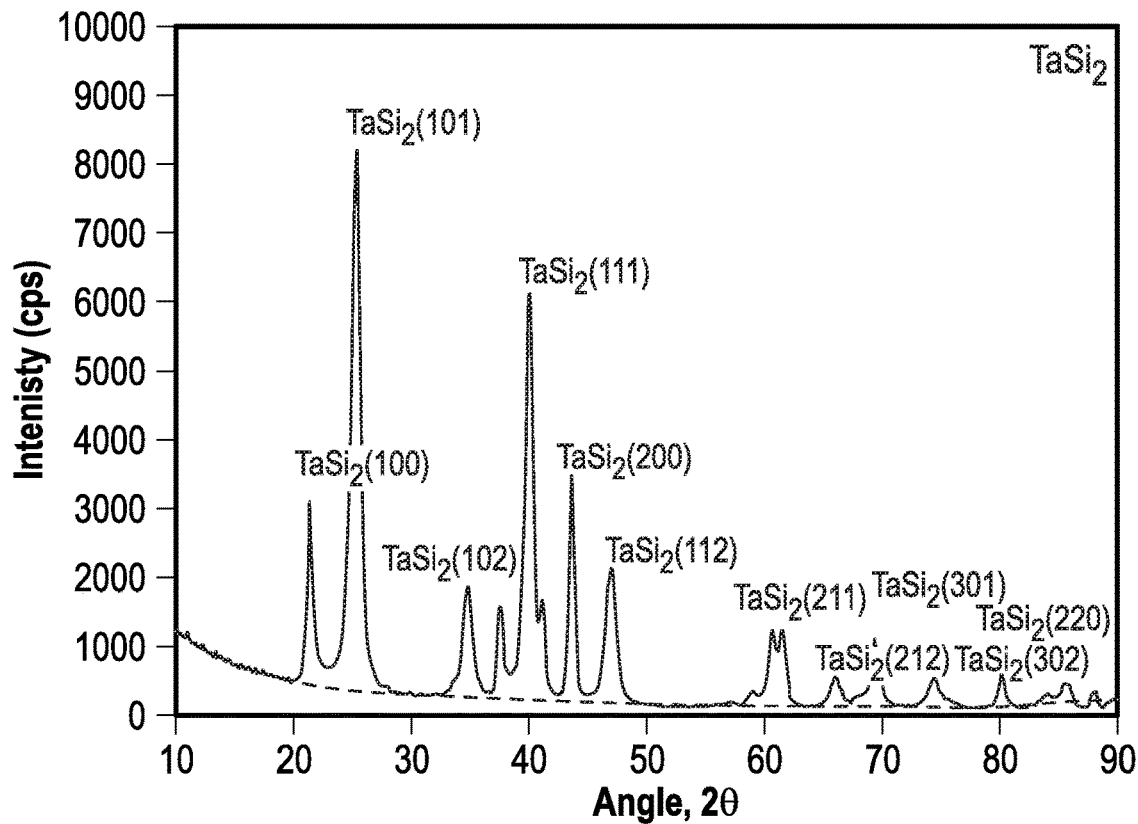
Figure 7D:
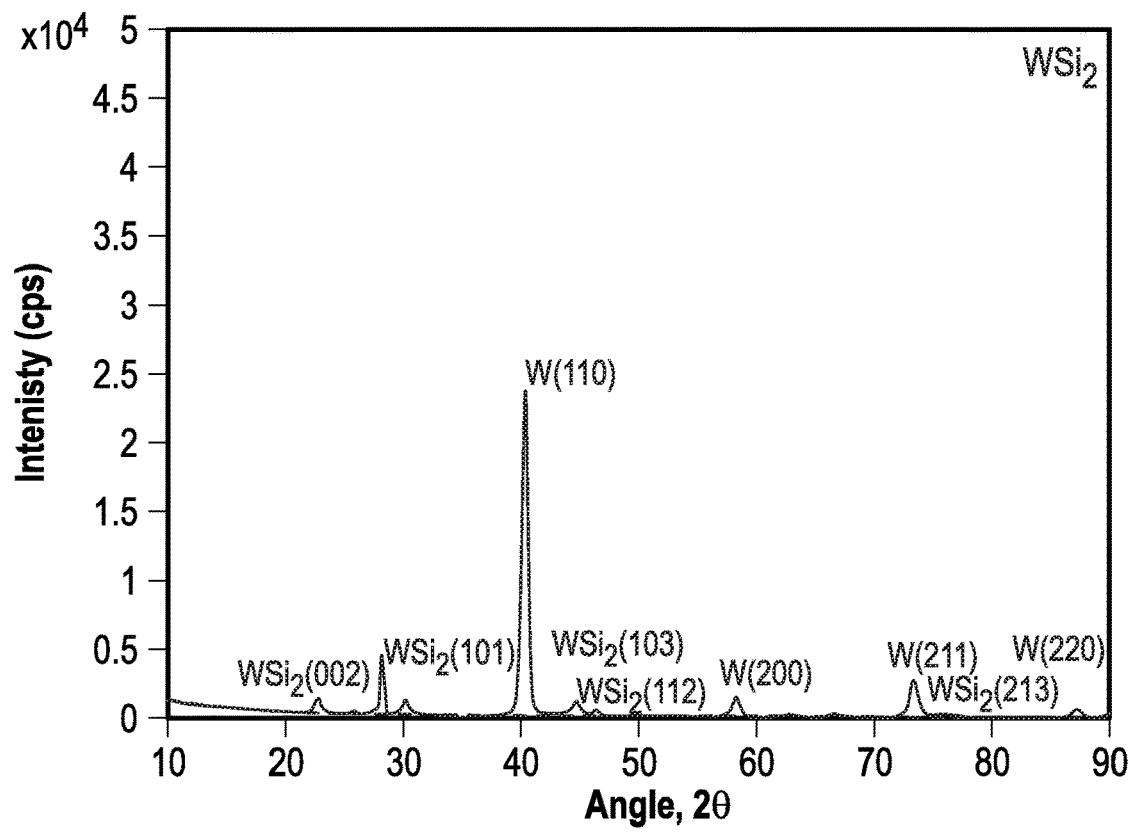
Figure 8A:
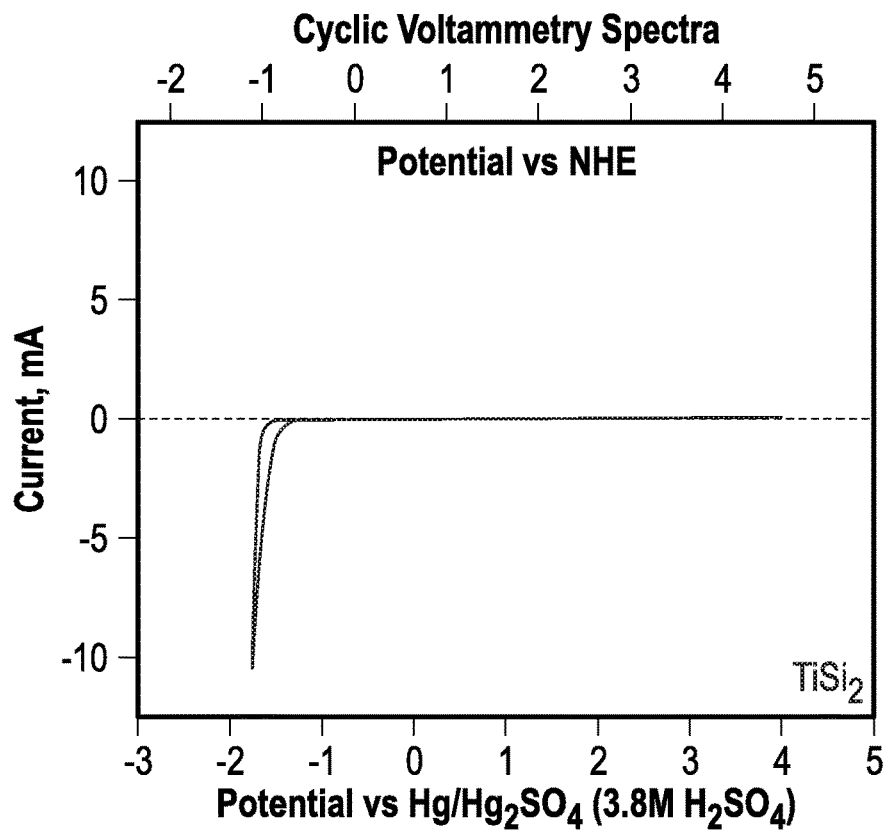
FIG. 8A, FIG. 8B, FIG. 8C, and FIG. 8D illustrate generally cyclic voltammetry spectra of various metal silicide material layers applied to a conductive silicon substrate, such as for use as a portion of a bipolar battery current collector assembly.
Figure 8B:
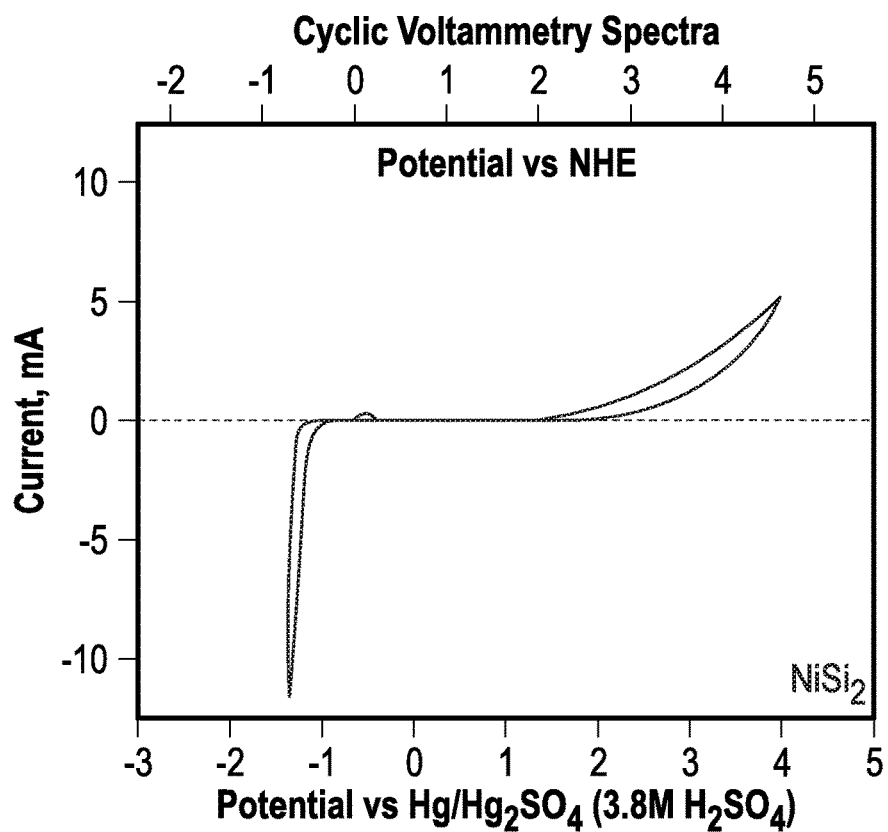
Figure 8C:
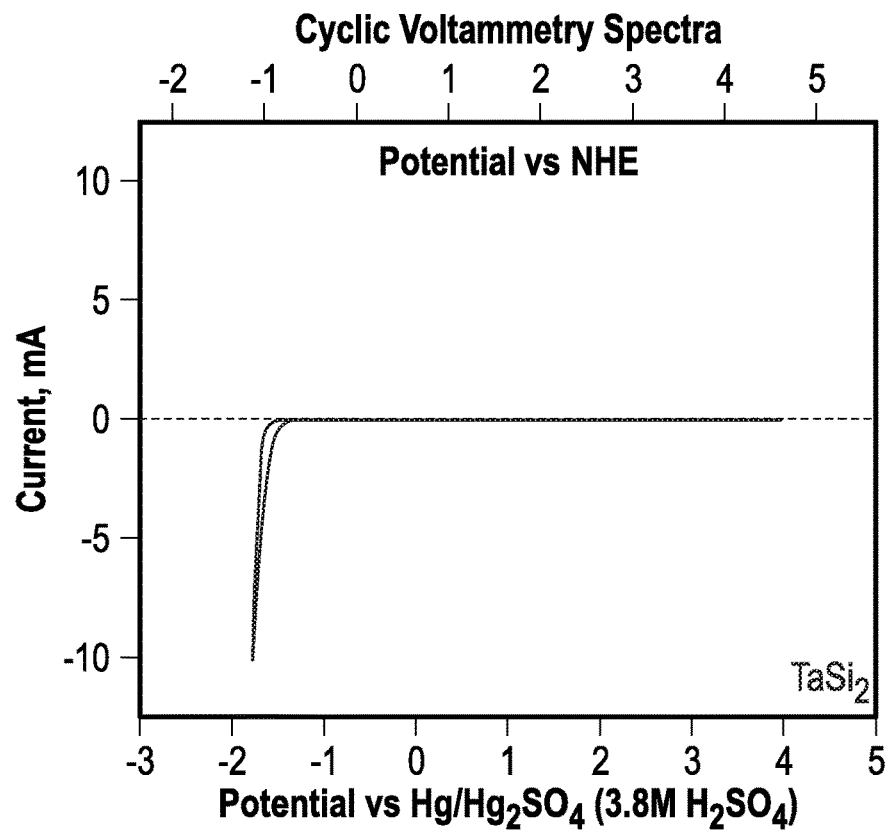
Figure 8D:
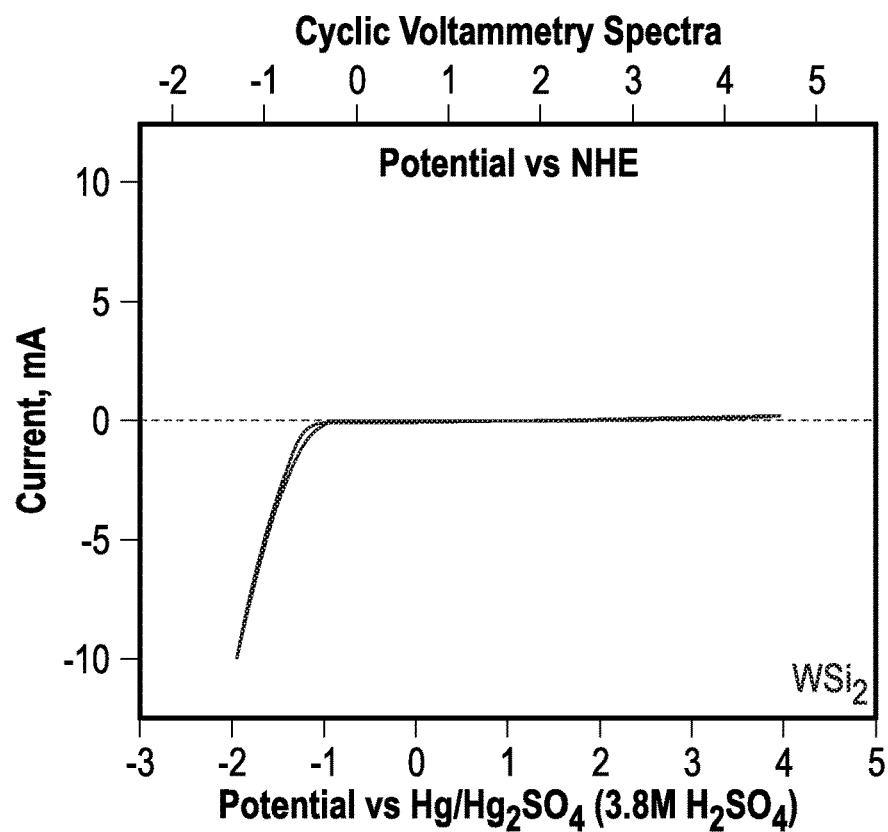

FIG. 5 illustrates generally a technique 500, such as method, that can include fabricating a bipolar battery current collector assembly. At 502, a conductive current collector substrate can be provided. For example, the conductive current collector substrate can include a silicon wafer, such as described in relation to other examples herein. At 504, optionally, the current collector substrate can be treated or otherwise modified. For example, an ohmic contact layer (e.g., a metal silicide) can be formed on one or more surfaces of the conductive current collector. At 506, a non-metallic support can be provided, such as including a support frame configuration as shown in FIG. 3A or FIG. 3B, as illustrative examples. At 508, the non-metallic support frame can be adhered to the current collector substrate, such as using an adhesive. As an illustrative example, a wafer-bonding adhesive or process can be used such as to adhere a non-conductive support frame to the current collector substrate. In an example, the support frame can provide an edge-seal ring.

A shape of a plastic support and a biplate comprising the current collector and other layers can be varied to accommodate various different bipolar technologies. The illustrative examples described herein generally concern use of semiconductor-grade water bonding to seal bipolar battery current collectors in their respective casings. While the phrase "semiconductor-grade" may be used to refer generally to a wafer bonding technique, the materials and processing techniques need not adhere strictly to such conditions used in generally-available semiconductor processing. For example, a current collector substrate material need not be semiconductor-grade, and can include multi-crystalline or metallurgical grade material, even though a semiconductor-type wafer bonding technique is used.

Illustrative Examples of Electrically-Conductive Current Collectors, Such as for Use as a Portion of a Bipolar Battery, and Such as can Include Various Edge-Seal Configurations Examples herein include, among other things, a current collector comprising silicon, and the fabrication thereof, such as for use in a bipolar lead acid battery. Silicon is abundant and silicon substrates for use as a portion of a current collector can be manufactured economically using semiconductor or solar fabrication technologies. A variety of processes can be used to manufacture silicon wafers and to modify electrical and chemical properties of silicon wafers.

FIG. 6A and FIG. 6B illustrate generally views of a technique, such as method, that can include fabricating a bipolar battery current collector assembly, including a plan view in FIG. 6A, and a section view in FIG. 6B. For example, at 604, an electrically-conductive silicon substrate can be provided or formed. As an illustrative example, semiconductor wafers can be made from electronic grade silicon at typically 9N to 11N purities (impurity levels less than one part per billion), such as having generally circular geometry, including diameters of 200 millimeters or 300 millimeters or more. Solar-grade wafers typically have purities of 6N to 9N (impurity levels at parts per on), and can include square geometries, such as available in standard sizes 125 millimeters or 156 millimeters, as illustrative examples. For use as current collectors of bipolar lead acid batteries, upgraded metallurgical grade (5N to 6N) or even metallurgical grade silicon (>98% pure) can be sufficient purity to retain the desirable characteristics of silicon for use as a current collector substrate.

Undoped high purity silicon generally behaves as a semiconductor, but silicon can be doped to tower its resistivity to provide a conductive substrate. For example, doping solar silicon with about 50 parts per million weight boron, such as during an ingot casting process, can lower the silicon resistivity to about 5 milliohm-centimeters (mΩ-cm). Purification of silicon generally involves removal of impurities, but for applications as a bipolar current collector, dopants can be used to lower a resistivity of silicon. In examples where upgraded metallurgical grade (UMG) or metallurgical grade (MG) silicon are used, addition of dopants is not necessarily required to achieve an acceptable conductivity.

As an illustrative example, an ingot can be cast with UMG or MG silicon in a furnace. Generally-available silicon ingots can have dimensions of 86×86×26 centimeters (e.g., "G5" size) or 105×105×30 centimeters (e.g., "G6" size), The ingot can be sawed into bricks or other units, such as having dimensions corresponding to at least one wafer dimension. Square or rectangular wafers can be used as current collectors based at least in part on a specified energy of the final battery assembly, or such as to conform to one or more industrial standard battery sizes. As an illustrative example, a G5 ingot can be cut into 20 bricks having dimensions of 146×190×250 millimeters (mm), such as for use in manufacture of U1-sized lead acid batteries, or into 12 bricks of dimensions 173×240×250 millimeters to manufacture GC2-sized batteries, according to group sizes established by Battery Council International (BCI).

A silicon brick can be cut into thin substrates (e.g., wafers), such as using a slurry saw or a diamond wire saw. As an illustrative example, wafer thicknesses from about 200 to about 1000 micrometers are suitable as current collectors for bipolar lead acid batteries. The substrate of the current collector generally does not contribute to storage capacity, and accordingly, thinner wafers can provide reduced weight. However, thicker wafers offer better mechanical strength. A tradeoff can exist between mechanical robustness and wafer thinness. For example, wafer thicknesses selected from a range of about 450 to 700 micrometers can be used, offering a compromise between mechanical strength and weight.

Silicon wafers can be processed to one or more of remove surface contaminants or texture a wafer surface for further processing. Cleaning approaches used elsewhere for semiconductor or solar wafer processing can be used. In an example, an "RCA" cleaning process can be used to remove organic and metal contaminants from the wafer surfaces (see, e.g., W. Kern and D. A. Puotinen: RCA Rev. 31 (1970) 187.) In another example, a potassium hydroxide treatment can be used as an etchant to texture the wafer surfaces. In an example, potassium hydroxide cleans at different temperatures and concentrations can be used to achieve a specified surface texture and chemical properties of the silicon wafers.

In an example, an edge exclusion region can be defined on one or both sides of the silicon wafer to facilitate edge-sealing later. To define an edge exclusion region, the wafer can be masked to expose the edge exclusion region, and silicon in the exclusion region can be modified by thermal oxidation to provide silicon dioxide or by nitration to provide silicon nitride or treated by chemical vapor deposition to provide silicon carbide. Other ways to modify the edge exclusion include mechanical roughening or polishing.

In order to protect the silicon wafer surface from oxidation elsewhere, such as unwanted formation of an insulating silicon oxide layer on the surface, an ohmic contact layer can be formed on one or both large surfaces of the wafers, such as at 606. One or more metal silicides can be used as the ohmic contact layer, such as to provide low electrical resistance, resistance to sulfuric acid corrosion, and stable electrochemistry with respect to a specified battery chemistry. Metal silicides can be deposited on silicon surfaces by direct co-sputtering, but other approaches can also be used. For example, a metal deposition operation can be used, such as followed by an annealing operation. In the metal deposition operation, a thin layer of metal, such as having a thickness in a range selected from about 50 to about 200 nanometers, can be deposited on one or both sides of the silicon wafer. Techniques such as physical vapor deposition, chemical vapor deposition, or electroplating can be used to deposit thin metallic layers on silicon wafer surfaces.

In an annealing operation, a metal-coated wafer can be heated to high temperatures such that the metal reacts with the underlying silicon to form a metal silicide layer on the silicon surface. As silicon is consumed and incorporated into the silicide layer, the metal silicide ohmic contact layer is fused with the silicon on the wafer. Annealing can be performed under an inert atmosphere such as nitrogen ($N_2$) or argon (Ar). Equipment for semiconductor or solar manufacturing can be used, including the tube furnace, a rapid thermal processing (RTP) system, or a conveyor belt furnace. Many transition metals can be used to form silicides, including one or more of titanium (Ti), chromium (Cr), iron (Fe), cobalt (Co), nickel (Ni), copper (Cu), zirconium (Zr), niobium (Nb), molybdenum (Mo), palladium (Pd), tantalum (Ta), tungsten (W), and platinum (Pt).

According to an illustrative example, 50 nanometers of titanium can be deposited on both sides of a silicon wafer by physical vapor deposition, followed by annealing to 800° C. for 5 minutes under nitrogen to form about 120 to about 130 nanometers of titanium disilicide ($TiSi_2$). Annealing of titanium under nitrogen environment results in a very thin layer of titanium nitride (TiN) on the surface. The wafer can be cleaned with hot hydrogen peroxide ($H_2O_2$) to remove titanium nitride from the surface selectively.

In an illustrative example, 50 nanometers of nickel can be deposited on both sides of the silicon wafer by physical vapor deposition. The nickel film is annealed to 450° C. for 5 minutes under nitrogen to form 110 to 120 nanometers of nickel silicide (NiSi) on the silicon wafer. The nickel silicide surface can then be cleaned with dilute hydrofluoric acid (HF) or ammonium bifluoride ($NH_4HF_2$). The nickel thin film can also be deposited by electroplating.

In an illustrative example, 50 nanometers of tantalum (Ta) can deposited on both sides of the silicon wafer by physical vapor deposition, followed by annealing to 800° C. for 5 minutes in nitrogen to form 120 nanometers of tantalum disilicide ($TaSi_2$). The surface can then be cleaned with either hot hydrogen peroxide or buffered oxide etch prior to further processing.

In an illustrative example, 50 nanometers of tungsten is deposited on both sides of the silicon wafer by physical vapor deposition, following by annealing to 800° C. for 5 minutes in nitrogen to form tungsten disilicide ($WSi_2$). Unreacted tungsten metal (W) on the ace is then selectively etched away with hydrogen peroxide ($H_2O_2$).

The silicon wafer can be edge-sealed after ohmic contact formation, according to an illustrative example, such as at 608. In a bipolar battery, each cell compartment is generally hermetically sealed from its neighbors to prevent electrolyte leakage which results in inter-cell short circuit. In an edge-sealing operation, the silicon wafer current collector can be bonded to an edge-ring made from a material compatible with battery manufacturing. For example, the edge ring can be an electrical insulator, impermeable to ions, and can form a portion of a hermetically-sealed structure. Examples of edge-sealing materials include plastics, ceramics, glass, or, composite materials which generally provide the aforementioned characteristics. In an example, a wafer can be bonded to an edge ring directly by intermolecular forces. In an example, the wafer is bonded to the edge ring by application of an adhesive under controlled temperature and pressure. Other wafer bonding techniques, including but not limited to plasma activated bonding, glass frit bonding, and anodic bonding can also be used.

At 610, an adhesion layer can be deposited on the metal silicide surfaces of the wafer, such as in order to promote adhesion of active materials to the surfaces of the silicon wafer current collector. The edge-seal can exclude deposition of the adhesion layer around the wafer edges, which can lead to inter-cell short circuit. In an example, the wafer can be cleaned in a sequence of solutions, including diluted hydrofluoric acid (HF), buffered oxide etch (BOE) or ammonium bifluoride ($NH_4HF_2$), and a layer of metallic lead (Pb) with thickness selected from a range of about 10 to 100 micrometers can be deposited on both sides of the wafer by electroplating.

In an example, lead tin (PbSn) alloy, such as having tin concentrations from about 0.5 to about 2 percent can be used as the adhesion layer. Electroplating can be accomplished using, for example, a fluoroborate-based bath chemistry, or with a methanesulfonate-based bath chemistry. In an example, lead or lead-tin is used as an adhesion layer for one or more of the positive or negative active materials. For example, lead or lead-tin might be used only on the negative-polarity side of the wafer. In such an example, a lead dioxide ($PbO_2$) or a lead-tin dioxide ($Pb_xSn_{1-x}O_2$) can be used to provide adhesion to the positive active material.

In an example, a lead (Pb) foil, such as having a thickness selected from a range of about 50 micrometers to about 100 micrometers can be affixed on one or more metal silicide surfaces of the current collector, such as using a combination of thermal and compression forces. Metallic alloys including lead-tin (PbSn) and lead-calcium-tin (PbCaSn) can also be used. In an example, a thickness selected from a range of about 1 micrometer to 10 micrometers of lead or lead-tin can be deposited on one or more metal silicide surfaces of the current collector, such as followed by thermocompression of about 50 micrometers to about 100 micrometers of lead (Pb) or lead-tin (PbSn) or lead-calcium-tin (PbCaSn) foil on the silicon wafer current collector.

FIG. 7A, FIG. 7B, FIG. 7C, and FIG. 7D) illustrate generally glancing incidence x-ray diffraction (XRD) spectra of various metal silicide material layers applied to a conductive silicon substrate, such as for use as a portion of a bipolar battery current collector assembly.

Some silicides have multiple phases having different properties. However, different silicide phases may have distinct annealing temperatures. For example, titanium forms two different silicides, C49-$TiSi_2$ and C54-$TiSi_2$. Nickel forms three different silicides, $Ni_2Si$, NiSi, and $NiSi_2$. X-ray diffraction can be used to identify the preferred silicide phases after formation of the ohmic contact layer. FIG. 7A, FIG. 7B, FIG. 7C, and FIG. 7D respectively show x-ray diffraction spectra of titanium disilicide ($TiSi_2$), nickel silicide (NiSi), tantalum disilicide ($TaSi_2$), and tungsten disilicide ($WSi_2$).

FIG. 8A, FIG. 8B, FIG. 8C, and FIG. 8D illustrate generally cyclic voltammetry spectra of various metal silicide material layers applied to a conductive silicon substrate, such as for use as a portion of a bipolar battery current collector assembly.

Metallization of the silicon wafer surfaces with silicides protects the surface from oxidation and preserves the electrical conductivity of the surface, and the present inventors have also recognized that metal silicides are also stable electrochemically. Several metal silicides on silicon surfaces have been investigated by cyclic voltammetry, wherein the potential of the metal silicide (the working electrode) is scanned with respect to a mercury-mercurous sulfate reference electrode and the current generated from electrochemical reactions at the metal silicide surface is measured against a graphite counter electrode.

Resulting experimentally-obtained cyclic voltammetry spectra from FIG. 8A, FIG. 8B, FIG. 8C, and FIG. 8D show that titanium disilicide ($TiSi_2$), nickel silicide (NiSi), tantalum disilicide ($TaSi_2$), and tungsten disilicide ($WSi_2$) have stable electrochemistries, as evidenced by the wide potential window of extremely low measured current from surface electrochemical reactions. In particular, all metal silicides have oxygen and hydrogen evolution over-potentials outside the operating range of lead acid battery chemistry.

Illustrative Examples Including a
Thermally-Conductive Rib

The simple current path of a bipolar battery architecture greatly decreases thru-resistance and improves material utilization, thus allowing for deeper cycling without damaging the active material. Batteries operating under high power applications generate considerable amounts of heat, and such heat generation can be exacerbated in higher-temperature ambient environments or other harsh environment applications, such as renewable energy backup.

Increasingly, applications for energy storage devices such as batteries are becoming more demanding. Historically, rechargeable secondary batteries were used in mobility applications where current and power requirements were generally quite consistent from cycle to cycle. Modern hybrid/electric vehicles and renewable energy systems pose unique challenges for battery manufacturers. These applications often involve large and repeated power delivery for short bursts, but still involve a consistent current draw in between such burst power events. Additionally, modern telecommunication stations and data centers generally include large numbers of batteries to remain on a trickle charge ready to deliver energy in case of power loss. Many of these data centers are located in high-temperature environments that create harsh conditions for batteries. This combination of more severe duty cycles and harsher ambient conditions creates a common problem for all electrochemical storage: heat buildup. Batteries generally have a temperature range in which they operate most efficiently. Operation outside of the specified temperature range can lead to premature degradation at a minimum and uncontrolled thermal runaway at worst.

Bipolar batteries have emerged as a prime candidate for dealing with the harsher duty cycles specified for modern battery systems. Bipolar batteries can provide a simple, low resistance configuration combined with the ease with which their voltage can be specified or selected through series stacking of cells makes them ideally suited for applications where efficient delivery of high power is needed. Bipolar batteries tend to include thin active material layers that are highly compressed to deliver these benefits and the result is improved cycle life under harsh duty cycles. Thinner active material layers become less stressed during high power cycling, but also degrade less during periods of inactivity due to compression effects. For example, bipolar lead-acid batteries show far less sulfation during standing periods and less active material shedding during high power events as compared to other configurations. However, bipolar batteries also have high cell densities to enhance energy density. A higher number of cells per unit volume in a bipolar configuration can generate significant thermal challenges in a demanding ambient environment, as compared to other battery configurations. In a bipolar battery configuration, heat generated within the active material can be conducted directly into the next cell if it is not given an appropriate pathway for transfer to the exterior. In sealed bipolar lead-acid batteries such thermal coupling between nearby cells can be particularly damaging because recombination reactions generally increase with increasing cell temperature. Furthermore, negative active material can generate as much as twice the amount of heat as the positive active material. When positive and negative active material regions are placed directly opposed to each other with nothing but a thin biplate in between, the reactions can essentially feed off of one another, such as causing or sustaining a thermal runaway failure.

Various approaches can be used to address heat dissipation issues in batteries. In one approach, each battery can be coupled to a control system that monitors the battery temperature in real time and adjusts the charge or discharge characteristics to compensate for heating, such as to suppress or reduce heating. Unfortunately, such a closed-loop control approach is a complex and costly solution that cannot be employed in all applications. Even applications that generally strictly control battery usage, such as telecommunications applications including backup power for central office facilities, can benefit greatly from batteries that are better able to regulate temperature without use of closed-loop control systems. Control systems can also help to ensure that thermal runaway never occurs, but such control systems can also limit the potential effectiveness of the battery by cutting off a charge or discharge to thermally stabilize the system, at the cost of efficiency or peaking capability. A battery that can passively tolerate supplying more power for a longer period of time is generally more appealing to end users. The present inventors have recognized, among other things, that passive improvement in heat transfer characteristics can eliminate or reduce a need for closed-loop control to perform thermal management. Alternatively, or additionally, improvement in passive heat dissipation performance can provide enhanced efficiency or peak power capability when used with closed-loop control, as compared to other battery configurations lacking improved heat dissipation capability.

In one approach, a heat exchanger can be included within the battery. Active material itself can be contained in a casing and that casing would then be surrounded by an additional casing. Between those casing walls, a fluid can be injected. Such a fluid generally suppresses excess environmental heat from entering the device. Secondly, a fluid generally provides a kind of thermal sink for heat from the active material. Use of a fluid-filled cavity can increase the weight and size of the battery pack and can increase a fragility of the battery by providing potential sources of leaks.

In another approach, a battery casing can include designated channels for air flow. For example, each battery cell be separated from others by an air gap. An external fan could then force air through these channels and cool the battery without requiring any additional weight within the battery itself. This is a potentially elegant solution, but may not be entirely suitable for bipolar batteries. Packaging efficiency of bipolar batteries is one attribute that can provide excellent energy density. Adding void space within the casing can decrease such an energy density. Additionally, bipolar batteries rely on a spatially short current path and large current collector surface area to deliver high power. Void space within the casing can complicate the current path or increase resistance, thus making bipolar batteries having a voided configuration potentially less efficient as compared to other configurations lacking such voice space.

In yet another approach, a conductive get can be installed, between the active material plates and the casing wall within an absorptive mat lead-acid battery. A battery with a conductive cell core can be used. This conductive core can carry heat directly from the center of the active material to a metallic strap where the terminals are located. In yet another approach, a casing can be configured such that the biplates are brought within a few millimeters of the external wall, to increase an amount of heat transfer that can occur to the environment. This may be useful for bipolar batteries because heat extracted from the biplates removes heat directly from both the positive and negative active masses of the cells.

All of the approaches mentioned above do not provide a full solution, individually. A silica conductive paste can be used in a monopolar battery configuration, but silica is also electrically conductive. In a bipolar battery, use of silica could provide an electrical short between adjacent cells. The conductive core approach might be suitable single-cell batteries, but may pose challenges for a bipolar configuration. For example, a thermal and electrical current path to the edge of the battery would lead to immediate shorting if the device was placed on a conductive surface, such as a battery rack. Current would flow immediately from one cell into the next and bypass the active material.

Moving bipolar electrodes as close as possible to a casing wall is possible, as mentioned above, but when the casing includes a homogenous polymer there is still significant thermal resistance even over short distances. Such thermal resistance can be amplified by the fact that many polymers (e.g., plastics) present no clear heat path. Generated heat tends to spread out (e.g., diffuse in bulk) throughout a plastic rather than heading for the cooler ambient. Additionally, placing biplates exceptionally close to the exterior leaves them susceptible to impact stresses that could crack them, thus causing the battery to fail.

The present inventors have recognized among other things that there remains a problem in providing improved heat transfer for bipolar batteries that does not risk performance degradation or promote casing weakening, and the present inventors describe such solutions herein. For example, in lieu of complex heat exchangers or additive materials, a battery casing itself can include material facilitating efficient exchange dissipation) of thermal energy. Specifically, highly thermally conductive materials can be installed as ribs along a length of a battery assembly, such as including one for every current collector. Such ribs can extend inward towards the current collector while leaving a gap to ensure that electrical current cannot flow from the battery to its exterior. Such a gap can be filled with an electrically insulating material, such as a thermoplastic. The thermoplastic or other electrical barrier can reduce or suppress current bridging the gap, but the gap can be sized and shaped to allow thermal energy to move across with reasonably high efficiency as compared to other approaches.

Furthermore, the present inventors have also recognized, among other things, that a flexible and robust bipolar battery assembly can be provided, such as use of conductive ribs along with a segmented battery stack. By discretizing a battery assembly into individual, identical (or nearly identical) cells, the battery assemblies can be modular and batteries of widely varying voltages. The use of ribs around each current collector facilitates sealing to each rib. Such ribs can then be sealed to a plastic casing that comprising electrolyte reservoirs. An entire battery assembly can, according to an illustrative example, be fabricated using only three or four different subassemblies. A reduction in variation of subassemblies can help to reduce manufacturing expense while making it easier to tune thermal properties of a battery for a particular application. The present inventors have, among other things, also developed various sealing embodiments that can be combined with the rib configuration described herein. The ribs can provide additional structure and protection for the current collectors, allowing thinner materials to be used and lowering internal resistance further.

Figure 9:
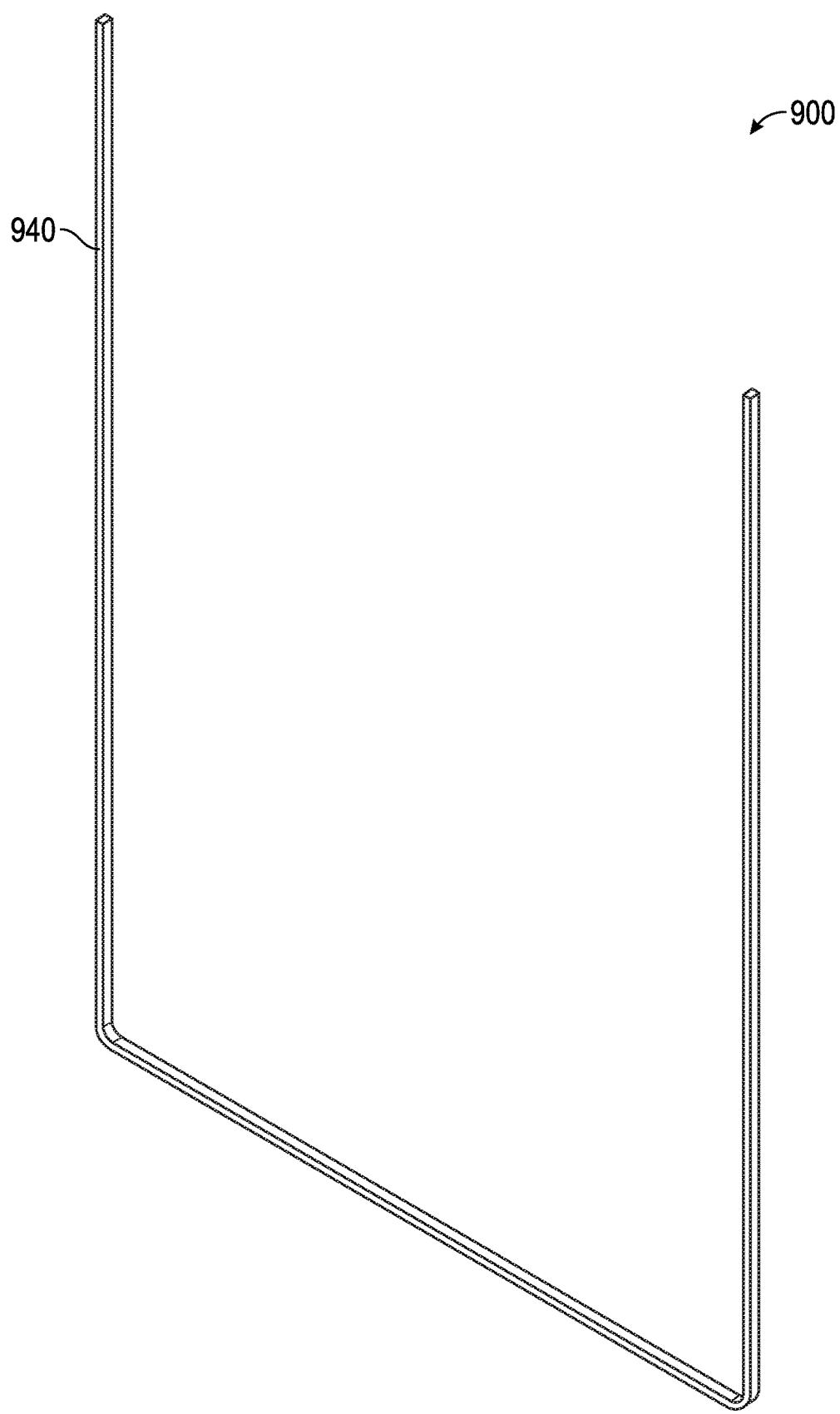
FIG. 9 illustrates generally a perspective view of a thermally-conductive rib that can be arranged around a portion or an entirety of a current collector assembly, such as for use in a bipolar battery.

FIG. 9 illustrates generally a perspective view 900 of a thermally-conductive rib 940 that can be arranged around a portion or an entirety of a current collector to provide an current collector assembly, such as for use in a bipolar battery. The thermally-conductive rib 940 can be arranged around the current collector in a bipolar battery, such as separated from an electrically-conductive substrate by a spacer. The thermally-conductive rib 940 can be manufactured from a highly-thermally conductive material such as a metal or a fiber-infused plastic.

Figure 10:
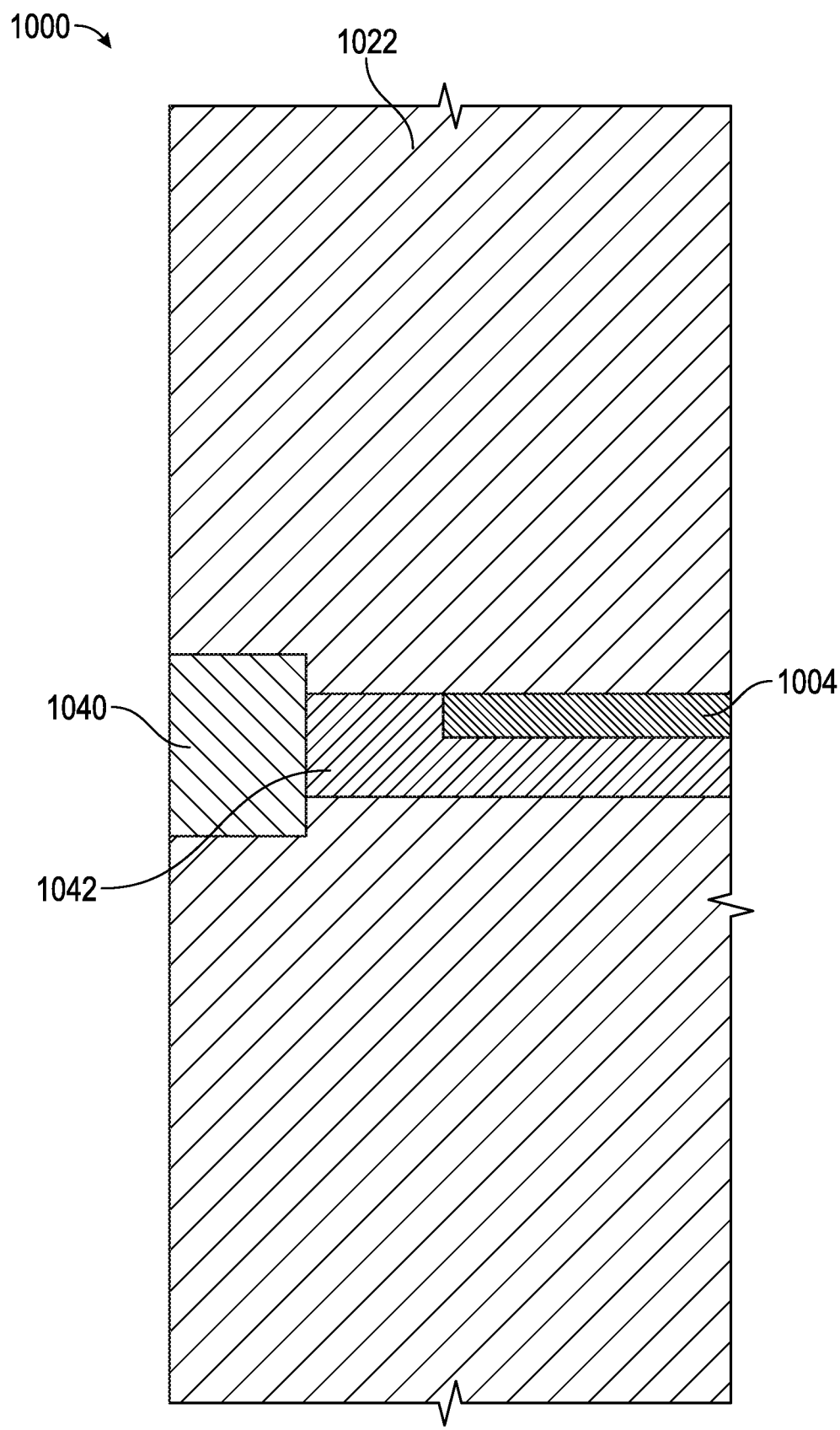
FIG. 10 illustrates generally a section view of a casing configuration such as can include a thermally-conductive rib.

FIG. 10 illustrates generally a section view 1000 of a casing configuration such as can include a thermally-conductive rib 1040. A current collector substrate, such as an electrically-conductive silicon substrate 1004 can be bonded to a frame 1042. The frame 1042 can include a non-conductive material, such as to provide an electrical resistance barrier between the substrate 1004 and the thermally-conductive rib 1040. A thickness of the frame 1042 at the location between the substrate 1004 and the thermally-conductive rib 1040 can be specified such as to be no more than about 3 millimeters (mm), such as to ensure efficient heat transfer with the thermally-conductive rib 1040. These three elements can then be bonded to one or more casing segments such as a casing segment 1022, such as comprising a thermoplastic material. Techniques including welding, heat sealing, or adhesive bonds can be used to provide a hermetic fit between components. In an example, the frame 1042 can include one or more of a support frame or edge-seal as mentioned in relation to other examples in this document.

In the illustrative examples of FIG. 9 and FIG. 10, the thermally-conductive ribs 940 and 1040 are shown as having a rectangular cross section. In other examples, such as when the battery is placed under forced convection, the surface area of the rib can be increased as shown illustratively in FIG. 13. For example, a serrated surface can be formed along the vertical edges that can extend slightly beyond the casing walls protruding beyond an exterior surface defined by one or more casing segments). If air was being circulated around or past the batteries, greater heat transfer would occur as a result of this increased surface area as compared to using a rectangular cross section mentioned above, such as providing enhanced heat transfer for extremely harsh or high-temperature environments. Many other possible cross sections are usable.

Referring back to FIG. 10, regardless of external profile or features of the thermally-conductive rib 1040, thermally-conductive rib 1040 can be electrically conductively isolated from the conductive substrate 1004 such as by approximately 3 mm of electrically insulating material. To provide such isolation, generally the thermally conductive rib (which may also be electrically conductive) is arranged to avoid physically touching the current collector substrate. Such physical contact without intervening material could create a current path that would lead to the battery exterior, thus creating the possibility for catastrophic shorting if the battery were placed on an electrically conductive service. An electrically insulating material between the current collector and rib can include a thermoplastic polymer or a ceramic material, or combinations thereof. The material can have a thermal conductivity specified such that uneven heating does not occur within the gap between the substrate 1004 and the rib 1040. To ensure efficient heat transfer, a thermally conductive paste, such as used for printed circuit boards for thermally bonding electrical components to a heatsink or printed circuit thermal pad, can be applied between the thermally-conductive rib 1040 and the frame 1042. Respective bipolar current collector assemblies can be assembled together to provide a battery assembly, such as shown in FIG. 11.

Figure 11:
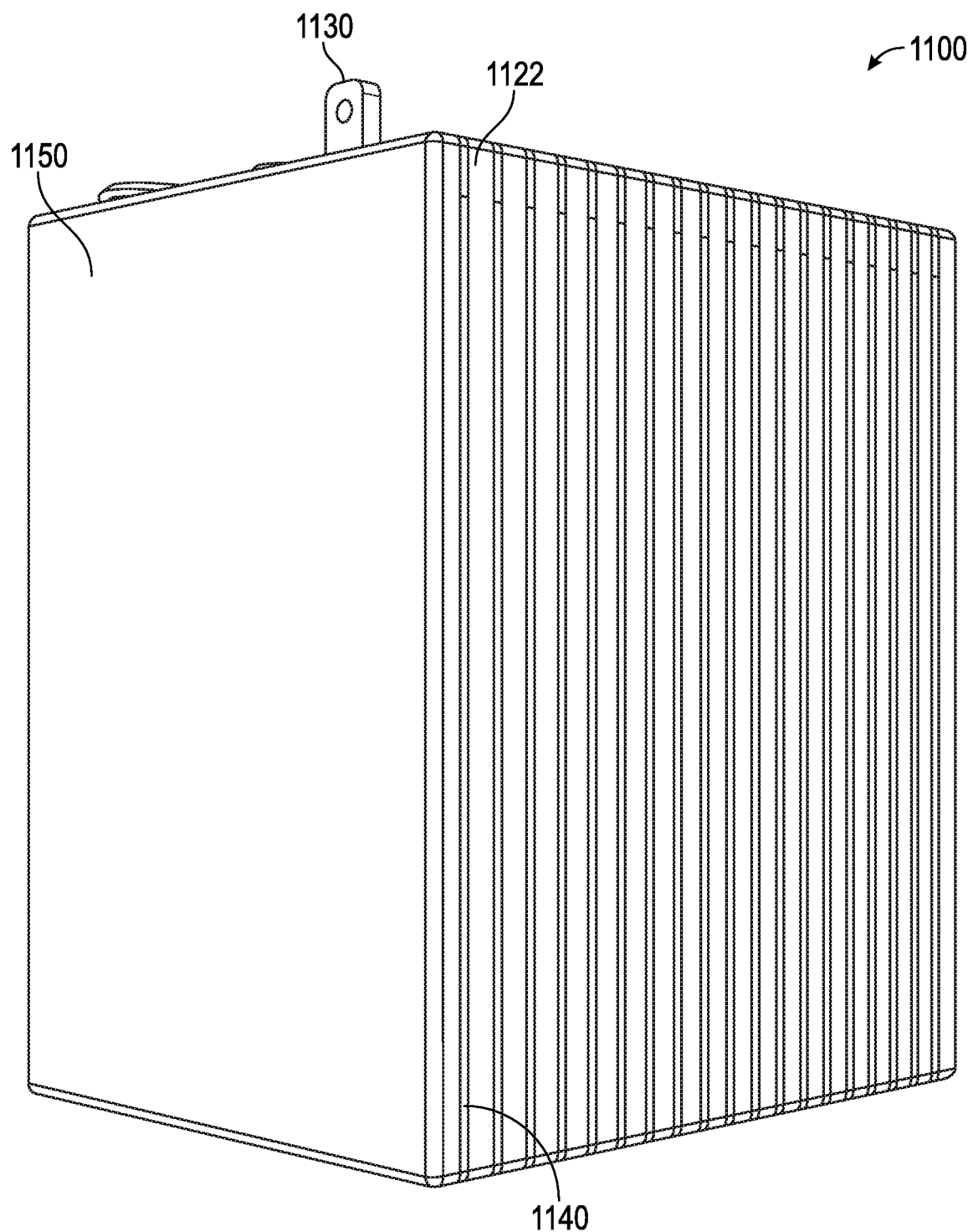
FIG. 11 illustrates generally a perspective view of a bipolar battery assembly, such as can include a casing configuration as shown and described in relation to other examples herein.

FIG. 11 illustrates generally a perspective view of a bipolar battery assembly 1100, such as can include a casing configuration as shown and described in relation to other examples herein. A backbone of the battery assembly 1100 can be provided at least in part using alternating casing rings (e.g., a casing segment 1122) and thermally-conductive ribs (e.g., including a thermally-conductive rib 1140), and including enclosed current collector substrates. By stacking these pieces in succession it is possible to arrange a battery stack having a specified voltage, assuming sufficient mechanical integrity. In this illustrative example, the battery assembly comprises 18 individual cells. The ends of the battery feature end caps, such as an end cap 1150, that can include the same material as the casing segments (e.g., a thermoplastic). There can also be metal terminals, such as a terminal 1130.

Through simulation and experimentation, the present inventors have, among other things, recognized that use of thermally-conductive ribs around bipolar battery current collectors can result in internal temperatures that are as much as about 5° C. lower under normal float operation at a 40° C. ambient temperature with no forced convection. Furthermore, such ribs have been shown to stabilize battery performance during temperature fluctuations allowing the bipolar batteries to maintain higher Coulombic efficiency as compared to configurations lacking such rib structures. Such efficiency can be provided in part by establishing a more uniform temperature within the battery stack.

Without any heat exchanging aid, a centrally-located, portion of the battery stack reaches the highest temperatures. Such a temperature gradient can be more pronounced as the voltage of the battery increases with the addition of more cells. Due to the cell density, heat flows more easily through the current collectors and, along the battery than outward through the perimeter and into the environment. In the central region of the battery, the present inventors have recognized that in the absence of heat transfer features, it is difficult to establish a configuration conveying heat efficiently all the way to the end caps, thus heat transfer is hindered and a localized temperature rise occurs. Thermally-conductive ribs allow more heat to be conveyed to the exterior, allowing the cells to operate at more consistent temperatures (e.g., an equilibrium temperature is more uniform one or more of along an exterior of the battery assembly or within a volume of the battery assembly). Due to the series connection, such enhanced heat transfer and reduced temperature gradient can greatly improve battery life by stabilizing efficiency and resulting in more uniform active material aging.

A difference between a thermal runaway condition and a thermally stable condition in batteries can be determined by a difference of just a few degrees Celsius in an internal equilibrium temperature. Thermal runaway can afflict almost any battery chemistry and its onset can generally be defined as an internal temperature at which the battery reaches a level of reactivity that is self-sustaining. More specifically, thermal runaway occurs when the electrochemical reactions within the active material reach a rate that is temperature independent. The battery temperature will continue increasing thereafter generally without regard to an ambient environment. A threshold at which a transition to thermal runaway occurs can be adjusted using a battery casing configured to provide enhanced heat exchange with a surrounding environment.

Use of discrete ribs around a current collector presents overall simplicity for a bipolar battery assembly. The presence of the ribs such as spanning the perimeter of the current collectors necessarily creates convenient assemblies that make processing the active material easier. For example, referring back to FIG. 10, if the current collector substrate 1004, electrically resistive frame 1042, and thermally-conductive rib 1040 are joined together into a single assembly, the current collector assembly itself becomes reinforced for all processing. As mentioned elsewhere, various geometries for the frame 1042 can be used, such as described above elsewhere.

If the current collector is a fragile material, such as a conductive substrate or wafer, the edges can be protected from impact by one or more of the rib 1040 or frame 1042 structures. This can facilitate use of less specialized processing equipment thus lowering the overall cost of the battery, even though the current collect can include a fragile or brittle material such as silicon. A manner in which these components are sealed together can be determined in part by the material system used for the battery assembly, but assuming the frame 1042 is made from plastic and the thermally-conductive rib 1040 is made from a carbon composite or other material, a low-cost plastic welding process being used. Completed substrate-frame-an-rib assemblies can then be assembled (such as sealed) into casing segments such as a casing segment 1022. Adjacent casing segments and substrate-frame-rib assemblies can define a hermetically-sealed electrolyte reservoir.

Assembling a bipolar battery in the manner generally described above can provide one or more advantages. First, a general simplicity of component subassemblies allows such components to be used repeatedly replicated) to provide a battery assembly. This lowers overall material costs and makes assembly operations simpler. Sealing of a battery directly around the current collector substrates can reinforce the battery where it is structurally weak or vulnerable, thus resulting in an assembly that is more resilient against shock and vibration. Third, the discretization into current collector assemblies and active material casings allows for all variation of overall battery voltage by stacking different numbers of components together at the time of assembly. Bipolar batteries are well-suited for power applications, and the ability to use batteries natively in these environments without complicated battery management systems brings the system cost down while maintaining the same (or an improved) level of overall safety and reliability.

The rib 1040 can be manufactured using a material having a high thermal conductivity, and can provide good corrosion resistance against environmental attack and chemical attack from the battery itself. The rib material can specified to be easily recyclable in existing streams for the battery chemistry. As illustrative examples, such as for use with lead-acid chemistry, a metal rib can be fabricated using 316 Stainless Steel or Hasteloy B. Aluminum might be less desirable due to induced complexity of the recycling stream, but otherwise provides high thermal conductivity as well. A conductive carbon composite can be used, such as including fibers aligned for enhanced thermal transfer. Regardless of material, the conductive rib can be sized and shaped, such as providing a large surface area to enhance heat exchange with the surrounding environment. A shape of the conductive ribs can take many forms depending upon the surrounding environment.

Figure 12:
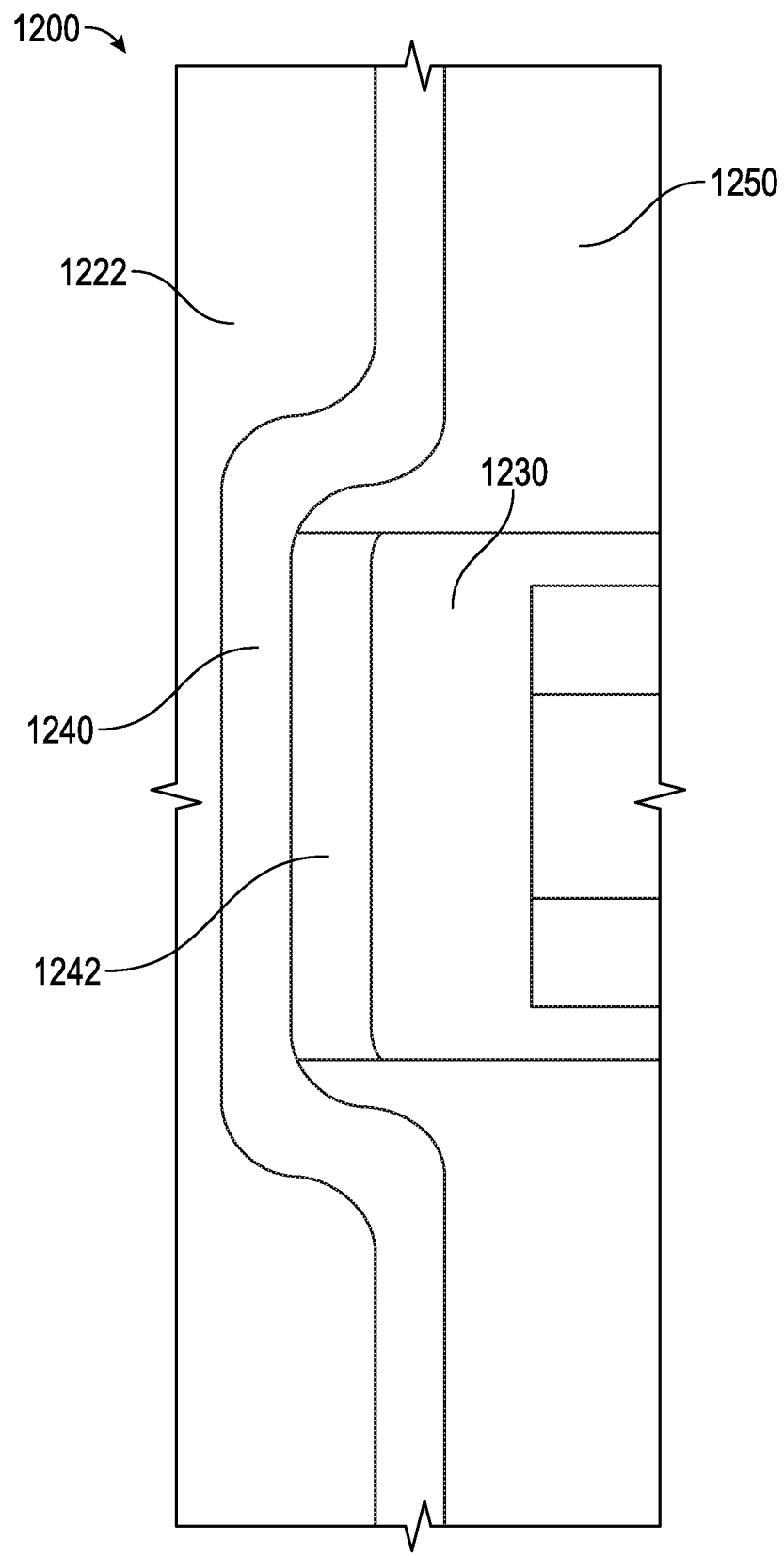
FIG. 12 illustrates generally a top view of a portion of a battery assembly, such as nearby a terminal area.

FIG. 12 illustrates generally a top view 1200 of a portion of a battery assembly, such as nearby a terminal area. In examples where a conductive rib 1240 is electrically-conductive as well as thermally-conductive, a electrically-insulating spacer 1242 can be placed between the thermally-conductive rib 1240 and the conductive battery terminal 1230. This is to ensure sufficient electrical isolation, thus preventing shorting when placing the battery on a conductive surface. In the view 1200, the thermally-conductive rib is not confined to a single plane and is "jogged" laterally in the region nearby the terminal 1230, such as including an inset to accommodate the spacer 1242. In an example where the terminal 1230 is located near an end of the battery assembly, an endcap casing segment 1250 can be located one face of the thermally-conductive rib 1240, and a casing segment 1222 or other portion of the casing can be located on the face opposite the endcap segment 1250.

Figure 13:
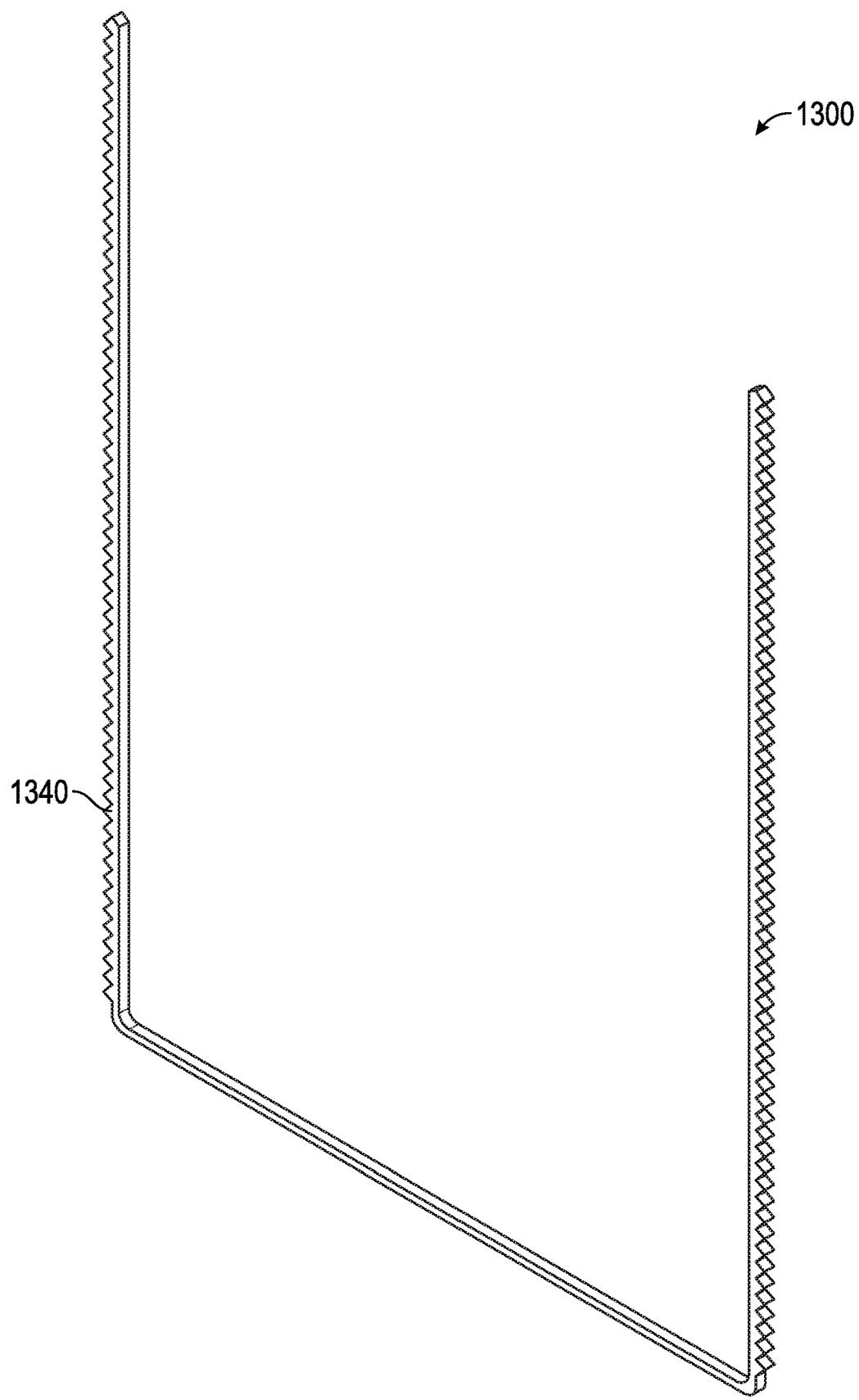
FIG. 13 illustrates generally a perspective view of another example of a thermally-conductive rib, such as having an increased exterior-facing surface area as compared to the example of FIG. 9.

FIG. 13 illustrates generally a perspective view 1300 of another example of a thermally-conductive rib 1340, such as having an increased exterior-facing surface area as compared to the example of FIG. 9. A serrated profile for the thermally-conductive rib 1340 allows for improved heat exchange under forced convection as compared to a profile lacking such serration.

Figure 14:
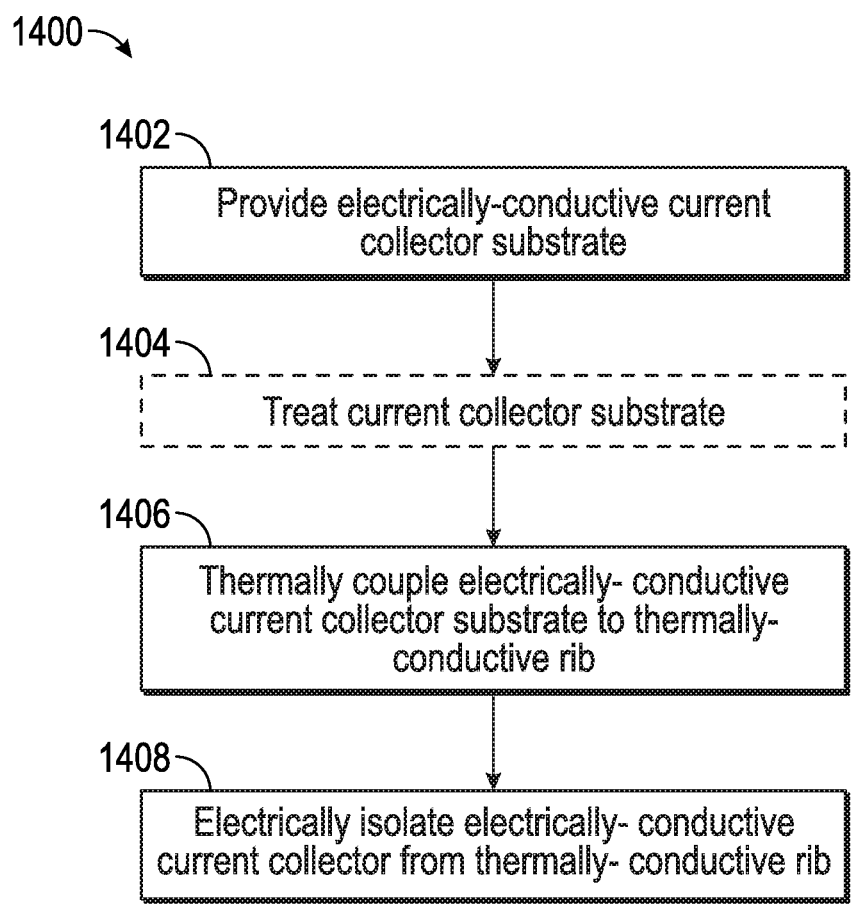
FIG. 14 illustrates generally a technique, such as method, that can include fabricating a bipolar battery current collector assembly.

FIG. 14 illustrates generally a technique 1400, such as method, that can include fabricating a bipolar battery current collector assembly. At 1402, an electrically-conductive current collector substrate can be provided, such as using techniques described in one or more examples elsewhere herein. At 1404, optionally, the current collector substrate can be treated or modified, such as through forming one or more thin film layers. At 1406, the electrically-conductive current collector substrate can be thermally-coupled to a thermally-conductive rib such as using a frame or edge-seal ring (or other structure configured as a spacer). At 1408, for example, the frame or edge-seal ring, or spacer, can electrically conductively isolate the electrically-conductive current collector substrate from the thermally-conductive rib, while still guiding heat transfer to from the substrate to the rib.

Various Notes & Examples

Example 1 can include or use subject matter (such as an apparatus, a method, a means for performing acts, or a device readable medium including instructions that, when performed by the device, can cause the device to perform acts), such as can include or use a current collector assembly, such as for a bipolar lead acid battery, the current collector assembly comprising an electrically-conductive silicon substrate and a frame bonded to the electrically-conductive silicon substrate, the electrically-conductive silicon substrate including one or more thin films which render a surface of the electrically-conductive silicon substrate electrically conductive and electrochemically stable in the presence of a lead acid electrolyte chemistry, where an interface between the frame and the electrically-conductive silicon substrate is hermetically sealed.

In Example 2, the subject matter of Example 1 optionally includes a casing segment and a thermally-conductive rib, the thermally-conductive rib bonded to the casing segment and the frame, where the frame forms a spacer that isolates the thermally-conductive rib from the electrically-conductive silicon substrate electrically.

In Example 3, the subject matter of any one or more of Examples 1 through 2 to optionally include that the frame comprises a support frame.

In Example 4, the subject matter of Example 3 optionally includes that the support fume is bonded to a casing segment of a bipolar battery casing.

In Example 5, the subject matter of any one or more of Examples 1 through 4 optionally include that the frame comprises an edge-seal extending around an entirety of a perimeter of the surface of the electrically-conductive silicon substrate.

In Example 6, the subject matter of any one or more of Examples 1 through 5 optionally include that the frame defines an edge-exclusion region on the electrically-conductive substrate.

In Example 7, the subject matter of Example 6 optionally includes that deposition of the one or more thin films is inhibited in the edge-exclusion region by the edge-seal.

In Example 8, the subject matter of any one or more of Examples 1 through 7 optionally includes that a thin film amongst the one or more thin films comprises a metal silicide formed on at least one surface of the electrically-conductive silicon substrate.

In Example 9, the subject matter of Example 8 optionally includes that the metal comprises one or more of titanium (Ti), chromium (Cr), iron (Fe), cobalt (Co), nickel (Ni), copper (Cu), zirconium (Zr), niobium (Nb), molybdenum (Mo), palladium (Pd), tantalum (Ta), tungsten (W), or platinum (Pt).

In Example 10, the subject matter of any one or more of Examples 8 through 9 optionally includes that an additional film is deposited on the metal silicide to promote adhesion of an active material.

In Example 11, the subject matter of Example 10 optionally includes that the additional film comprises a lead metal (Pb) or a lead-tin alloy (PbSn).

In Example 12, the subject matter of any one or more of Examples 1 through 11 optionally includes that the frame is bonded to wafer using a wafer bonding adhesive.

In Example 13, the subject matter of any one or more of Examples 1 through 12 optionally includes that the frame comprises a plastic, ceramic, or composite material.

Example 14 can include, or can optionally be combined with the subject matter of one or any combination of Examples 1 through 13 to include, subject matter (such as an apparatus, a method, a means for performing acts, or a machine readable medium including instructions that, when performed by the machine, that can cause the machine to perform acts), such as can include a casing assembly, such as for a bipolar lead acid battery, the casing assembly comprising an electrically-conductive silicon substrate; a spacer bonded to the electrically-conductive silicon substrate, the electrically-conductive silicon substrate including one or more thin films which render a surface of the electrically-conductive silicon substrate electrically conductive and electrochemically stable; a casing segment; and a thermally-conductive rib, the thermally-conductive rib bonded to the casing segment and the spacer, wherein the spacer isolates the thermally-conductive rib from the electrically-conductive silicon substrate electrically.

In Example 15, the subject matter of Example 14 optionally includes that a thin film amongst the one or more thin films comprises a metal silicide formed on at least one surface of the electrically-conductive silicon substrate.

In Example 16, the subject matter of any one or more of Examples 13 through 15 optionally include that the metal comprises one or more of titanium (Ti), chromium (Cr), iron (Fe), cobalt (Co), nickel (Ni), copper (Cu), zirconium (Zr), niobium (Nb), molybdenum (Mo), palladium (Pd), tantalum (Ta), tungsten (W), or platinum (Pt).

In Example 17, the subject matter of any one or more of Examples 15 through 16 optionally include that an additional film is deposited on the metal silicide to promote adhesion of an active material.

In Example 18, the subject matter Example 17 optionally includes that the additional film comprises a lead metal (Ph) or a lead-tin alloy (PhSn).

Example 19 can include, or can optionally be combined with the subject matter of one or any combination of Examples 1 through 18 to include, subject matter (such as an apparatus, a method, a means for performing acts, or a machine readable medium including instructions that, when performed by the machine, that can cause the machine to perform acts), such as can include a method for providing a current collector for a bipolar lead acid battery, the method comprising bonding a frame bonded to an electrically-conductive silicon substrate, modifying the electrically-conductive silicon substrate with one or more thin films which render a surface of the silicon conductive and electrochemically stable in lead acid electrolyte chemistry, where an interface between the frame and the electrically-conductive silicon substrate is hermetically sealed.

In Example 20, the subject matter of Example 19 optionally includes that the frame comprises an edge-seal extending around an entirety of a perimeter of the surface of the electrically-conductive silicon substrate.

In Example 21, the subject matter of any one or more of Examples 19 through 20 optionally include that the frame defines an edge-exclusion region on the electrically-conductive substrate.

In Example 22, the subject matter of Example 21 optionally includes that deposition of the one or more thin films is inhibited in the edge-exclusion region by the edge-seal.

In Example 23, the subject matter of any one or more of Examples 19 through 22 optionally include that the frame is bonded to the electrically-conductive silicon substrate directly by intermolecular forces.

In Example 24, the subject matter of any one or pore of Examples 19 through 23 optionally include that the frame is bonded to the wafer with an adhesive at high temperature under compressive forces.

In Example 25, the subject matter of any one or more of Examples 19 through 24 optionally include that the frame is bonded to the wafer using one or more of plasma activated bonding, glass fit bonding, or anodic bonding.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect) other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A current collector assembly for a bipolar lead acid battery comprising:
   an electrically-conductive silicon substrate;
   a frame coupled to the electrically-conductive silicon substrate, the electrically-conductive silicon substrate including one or more thin films which render a surface of the electrically-conductive silicon substrate electrically conductive and electrochemically stable in the presence of a lead acid electrolyte chemistry; and
   a casing segment and a thermally-conductive rib, the thermally-conductive rib mechanically coupled to the casing segment and the frame, wherein the frame forms a spacer that isolates the thermally-conductive rib from the electrically-conductive silicon substrate electrically.

2. The current collector assembly of claim 1, wherein the frame comprises a support frame.

3. The current collector assembly of claim 2, wherein the support frame and the casing segment of a bipolar battery casing form a single assembly.

4. The current collector assembly of claim 1, wherein the frame comprises an edge-seal extending around an entirety of a perimeter of the surface of the electrically-conductive silicon substrate.

5. The current collector assembly of claim 1, wherein the frame defines an edge-exclusion region on the electrically-conductive substrate.

6. The current collector assembly of claim 5, wherein deposition of the one or more thin films is inhibited in the edge-exclusion region by the edge-seal.

7. The current collector assembly of claim 1, wherein a thin film amongst the one or more thin films comprises a metal silicide formed on at least one surface of the electrically-conductive silicon substrate.

8. The current collector assembly of claim 7, wherein the metal comprises one or more of titanium (Ti), chromium (Cr), iron (Fe), cobalt (Co), nickel (Ni), copper (Cu), zirconium (Zr), niobium (Nb), molybdenum (Mo), palladium (Pd), tantalum (Ta), tungsten (W), or platinum (Pt).

9. The current collector assembly of claim 7, wherein an additional film is deposited on the metal silicide to promote adhesion of an active material.

10. The current collector assembly of claim 9, wherein the additional film comprises a lead metal (Pb) or a lead-tin alloy (PbSn).

11. A method for providing a current collector for a bipolar lead acid battery, the method comprising:

supporting an electrically-conductive silicon substrate using a frame;

modifying the electrically-conductive silicon substrate with one or more thin films which render a surface of the silicon conductive and electrochemically stable in lead acid electrolyte chemistry; and mechanically coupling a thermally-conductive rib to a casing segment and the frame to form a single assembly, wherein the frame forms a spacer that isolates the thermally-conductive rib from the electrically-conductive silicon substrate electrically.

12. The method of claim 11, wherein the frame comprises an edge-seal extending around an entirety of a perimeter of the surface of the electrically-conductive silicon substrate.

13. The method of claim 11, wherein the frame defines an edge-exclusion region on the electrically-conductive substrate.

14. The method of claim 13, wherein deposition of the one or more thin films is inhibited in the edge-exclusion region by the edge-seal.

15. The method of claim 11, wherein the frame is bonded to the electrically-conductive silicon substrate directly by intermolecular forces.

16. The method of claim 11, wherein the frame is bonded to the wafer with an adhesive at high temperature under compressive forces.

17. The method of claim 11, wherein the frame is bonded to the wafer using one or more of plasma activated bonding, glass frit bonding, or anodic bonding.

18. The method of claim 11, wherein a thin film amongst the one or more thin films comprises a metal silicide formed on at least one surface of the electrically-conductive silicon substrate.

* * * * *